US007298404B2

(12) United States Patent
Shimazaki

(10) Patent No.: US 7,298,404 B2
(45) Date of Patent: Nov. 20, 2007

(54) CONTOUR-EMPHASIZING DEVICE

(75) Inventor: Shingo Shimazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 919 days.

(21) Appl. No.: 10/474,715

(22) PCT Filed: Apr. 11, 2002

(86) PCT No.: PCT/JP02/03633

§ 371 (c)(1),
(2), (4) Date: Oct. 9, 2003

(87) PCT Pub. No.: WO02/084998

PCT Pub. Date: Oct. 24, 2002

(65) Prior Publication Data

US 2004/0119858 A1 Jun. 24, 2004

(30) Foreign Application Priority Data

Apr. 11, 2001 (JP) .............................. 2001-113180

(51) Int. Cl.
*H04N 9/64* (2006.01)
*H04N 9/68* (2006.01)
*H04N 5/228* (2006.01)
*G06K 9/40* (2006.01)

(52) U.S. Cl. ................... 348/253; 348/222.1; 348/234; 382/266

(58) Field of Classification Search ................ 348/252, 348/625, 606, 254, 222.1, 264, 272; 382/266, 382/268, 260, 264, 270

See application file for complete search history.

(56) References Cited

U.S. PATENT DOCUMENTS 5,038,388 A * 8/1991 Song ........................... 382/266
6,043,853 A * 3/2000 Shimazaki et al. ......... 348/625

(Continued)

FOREIGN PATENT DOCUMENTS

JP 7-327152 12/1995

(Continued)

*Primary Examiner*—Ngoc-Yen Vu
*Assistant Examiner*—Peter Chon
(74) *Attorney, Agent, or Firm*—Frommer Lawrence & Haug LLP; William S. Frommer

(57) ABSTRACT

The present invention provides an edge enhancing apparatus (20) including a filter (51) to extract a horizontal high-frequency component of a video signal, a rise/fall detection detector (52) to detect leading and trailing edges of the horizontal high-frequency component of the video signal, and a waveform balancer (53) to multiply the high frequency component extracted by the filter (51) by a gain to generate an enhancement signal for enhancing the original video signal. The waveform balancer (53) works to make the gain a value larger than "1" when the signal level of the high frequency component at the leading edge of the video signal is positive while making the gain a value of "1" or smaller than "1" when the signal level of the high frequency component at the leading edge of the video signal is negative, and make the gain a value of "1" or smaller than "1" when the signal level of the high frequency component at the trailing edge of the video signal is positive while making the gain a value larger than "1" when the signal level of the high frequency component at the trailing edge of the video signal is negative.

18 Claims, 16 Drawing Sheets

U.S. PATENT DOCUMENTS

| | | |
|---|---|---|
| 6,094,205 A | 7/2000 | Jaspers |
| 6,148,115 A * | 11/2000 | Mackinnon et al. ........ 382/266 |
| 6,614,474 B1 * | 9/2003 | Malkin et al. .............. 348/252 |
| 6,774,943 B1 * | 8/2004 | Kao et al. ................... 348/252 |
| 6,850,275 B1 * | 2/2005 | Minakami ................... 348/252 |

FOREIGN PATENT DOCUMENTS

| | | |
|---|---|---|
| JP | 8-317253 | 11/1996 |
| JP | 11-355610 | 12/1999 |
| JP | 2000-312301 | 11/2000 |

* cited by examiner

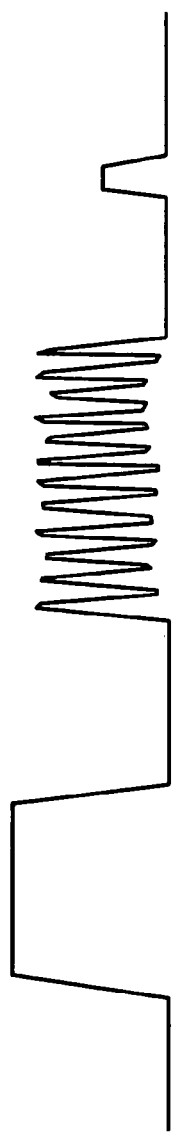
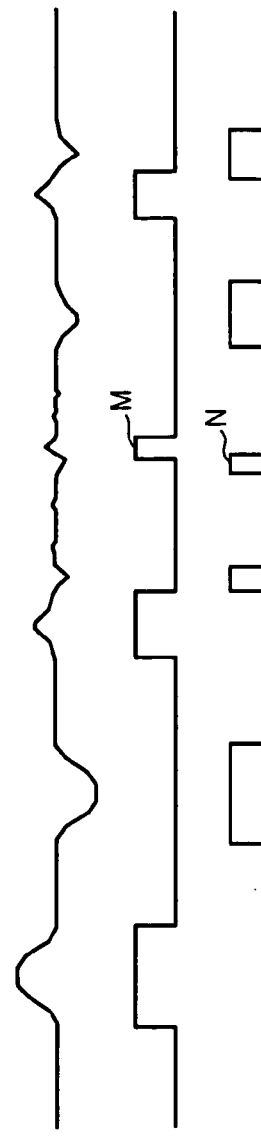
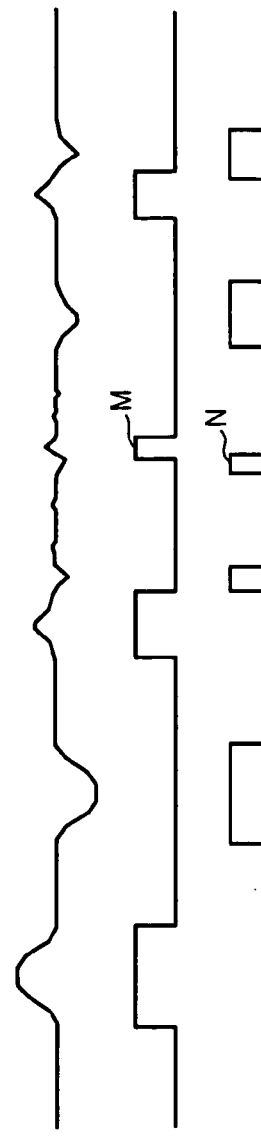
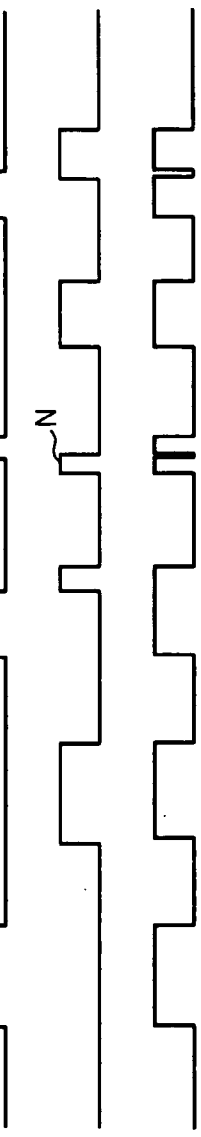
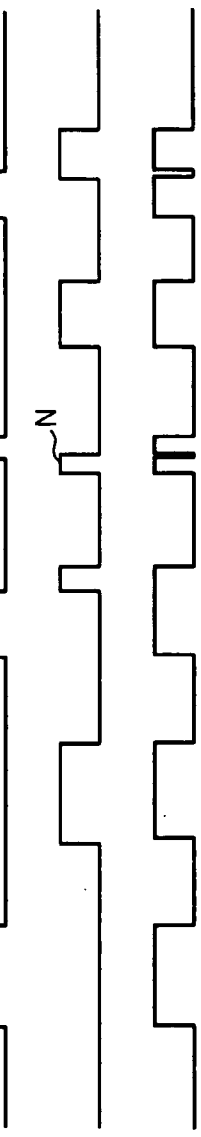
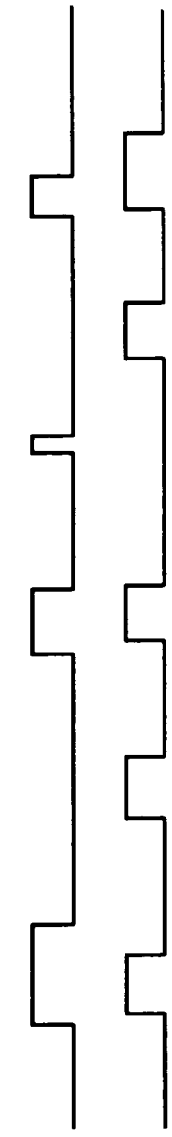
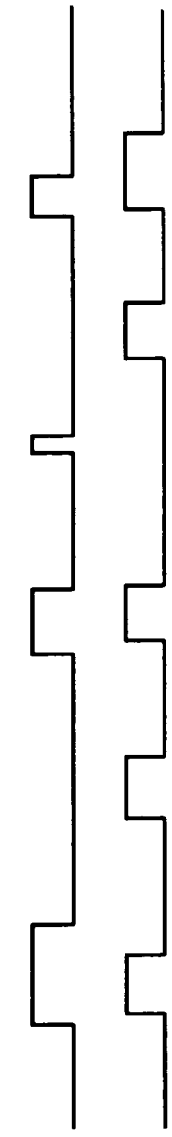
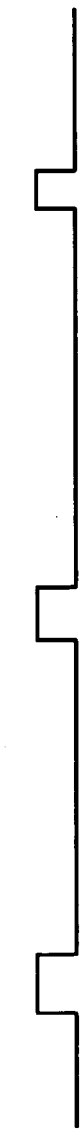
FIG.16A x1
FIG.16B x2
FIG.16C x3
FIG.16D x4
FIG.16E x5
FIG.16F x6
FIG.16G x7
FIG.16H x8
FIG.16I x9

CONTOUR-EMPHASIZING DEVICE

TECHNICAL FIELD

The present invention relates to an edge enhancing apparatus which enhances edges of a video signal.

BACKGROUND ART

The construction of a video camera using a conventional digital signal processing will be described with reference to FIG. 1. It should be noted that for the convenience of the explanation of the video camera, red (R), green (G) and blue (B) signal channels (will be referred to simply as R, G and B channels, respectively) sharing the same processing circuit, for example, will be identified with a common reference to which R, G and B are suffixed, respectively. The video camera is disclosed in the Japanese Unexamined Patent Application Nos. 46576 of 1997 and 65935 of 1980.

In FIG. 1, the conventional video camera is generally identified with a reference 501. As shown, the video camera 501 includes a pickup lens 511, color separation prism 512, three solid-state image sensing devices, 513R, 523G and 513B, such as a charge-coupled device (CCD) provided for R, G and B channels, respectively, three correlated double sampling circuits (CDS) 514R, 514G and 514B provided for the R, G and B channels, respectively, analog signal processing circuits 515R, 515G and 515B for the R, G and B channels, respectively, and analog-to-digital (A/D) conversion circuit (A/D converter) 516R, 516G and 516B provided for the R, G and B channels, respectively.

The video camera 501 also includes up converters 517R, 517G and 157B provided for the R, G and B channels, respectively, a linear matrix circuit 518, a kneeing circuit 519, an image enhancer 520, edge correction addition circuits 521R, 521G and 521B provided for the R, G and B channels, respectively, a gamma correction circuit 522, clipping circuits 523R, 523G and 523B provided for the R, G and B channels, respectively, and a signaling system changeover circuit 524.

Once the video camera 501 is put into action, light from an object is incident upon the pickup lens 511. The incident light is separated by the color separation prism 512 into three primary colors R, G and B. The color separation prism 512 has accurately fixed thereto the CDDs 513R, 513G and 513B corresponding to the primary colors R, G and B. The primary lights R, G and B separated by the color separation prism 512 are incident upon the CCDs 513R, 513G and 513B, respectively. Output signals from the CCDs 513R, 513G and 513B, indicating the primary colors R, G and B, respectively, are supplied to the CDS circuits 514R, 514G and 514B where the respective signals R, G and B will subjected to the correlated double sampling to generate analog video signals, respectively. The analog video signals are supplied to the analog signal processing circuits 515R, 515G and 515B, respectively, where they will be amplified and subjected to various analog signal processing including black-and-white (B/W) balancing, B/W shading, flare correction, etc. The analog video signal outputs from the analog signal processing circuits 515R, 515G and 515B are supplied to the A/D converters 516R, 516G and 516B, respectively, where the analog video signals will be sampled at a predetermined rate and converted into digital video signals, respectively. The digital video signal outputs from the A/D converters 516R, 516G and 516B are supp/lied to the up converters 517R, 517G and 517B and image enhancer 520.

Each of the up converters 517R, 517G and 517B includes a zero insertion circuit and interpolating filter to raise the sampling rate for digital video signals and re-sample the digital video signals. Normally, the sampling frequency used in the A/D conversion is the same as the horizontal drive frequency of the CCDs 513R, 513G and 513B. The digital signal processing in the video camera includes nonlinear processing such as the kneeing, gamma correction, B/W clipping, etc. which will be described later. Such nonlinear processing of a video signal will result in distortion of the signal waveform and occurrence of a harmonic whose frequency is several times higher than a frequency included in the video signal. When the harmonic component thus developed exceeds the Nyquist frequency (a half of the sampling frequency), it will return to a band of lower frequencies and become a return noise which will deteriorate the image quality. To avoid this, the Nyquist frequency is raised and the digital video signals are re-sampled with a higher frequency by the up converters 517R, 517G and 517B to prevent the return noise from occurring. The digital video signal outputs from the up converters 517R, 517G and 517B are supplied to the linear matrix circuit 518.

The linear matrix circuit 518 makes color correction of the video signals to correct color reproduction error caused by the fact that the imaging characteristic of the CCD is different from the ideal one. The video signal outputs from the linear matrix circuit 518 are supplied to the kneeing circuit 519.

The kneeing circuit 519 makes gradation compression of high-luminance portions of the video signals according to a predetermined kneeing characteristic. The video signal outputs from the kneeing circuit 519 are supplied to the addition circuits 521R, 521G and 521B.

The image enhancer 520 extracts high frequency components from the video signals and multiplies the high frequency components by a predetermined gain to thereby produce edge-enhancement signals for enhancing the edges of the video signals. The edge-enhancement signal outputs from the image enhancer 520 are supplied to the addition circuits 521R, 521G and 521B.

The addition circuits 521R, 521G and 521B are provided to add edge-enhancement signals to the video signals to shape the waveforms of the video signal edges. The video signals having the waveforms thereof thus shaped by the addition circuits 521R, 521G and 521B are supplied to the gamma correction circuit 522 where the video signals will be subjected to gamma correction. The video signal outputs from the gamma correction circuit 522 are supplied to the clipping circuits 523R, 523G and 523B. The clipping circuits 523R, 523G and 523B clip the signals whose levels are over the standard television video signal level. The video signal outputs from the clipping circuits 523R, 523G and 523B are supplied to the signaling system changeover circuit 524. The signaling system changeover circuit 524 converts the video signals into ones necessary for the system configuration of the video camera 501, such as NTSC- or PAL-based analog composite video signal, analog component video signals such as Y (luminance) signal, R-Y signal and B-Y signal, serial digital video data or the like.

Next, the image enhancer 520 will be described below with reference to FIG. 2.

As shown, the image enhancer 520 includes three vertical filters 531R, 531G and 531B provided for the R, G and B channels, respectively, horizontal-component up converters 532R, 532G and 532B provided for the R, G and B channels, respectively, vertical-component up converters 533R, 533G and 533B provided for the R, G and B channels, respectively, a horizontal-component R/G/B mixing circuit 534, a vertical-component R/G/B mixing circuit 535, horizontal edge enhancement signal generation circuit 536, a vertical edge enhancement signal generation circuit 537, an addition circuit 538, and a gain control circuit 539.

The digital video signals on the R, G and B channels branched from the A/D converters 516R, 516G and 516B are supplied to the vertical filters 531R, 531G and 531B, respectively, of the image enhancer 520. That is, the digital video signal on the R, G and B channels branched from the A/D converter 516R is supplied to the R-channel vertical filter 531R, the digital video signal on the G channel branched from the A/D converter 516G is supplied to the G-channel vertical filter 531G, and the digital video signal on the B channel branched from the A/D converter 516B is supplied to the B-channel vertical filter 531B.

As shown, the R-channel vertical filter 531R includes a first 1H delay circuit 541R, second 1H delay circuit 542R, vertical lowpass filter (LPF) 543R, and a vertical highpass filter (HPF) 544R. The first 1H delay circuit 541R delays the R component one horizontal sync period (1H), the second 1H delay circuit 542R is supplied with the R component having been delayed the one horizontal sync period (1H) by the first 1H delay circuit 541R, and will delay the R component a further horizontal sync period (1H). Namely, the second 1H delay circuit 542R outputs the R component delayed a total of two horizontal sync periods (2H). The vertical LPF 543R and vertical HPF 544R supplied with an R component not delayed (0H delay), R component delayed one horizontal sync period (1H) and an R component delayed two horizontal sync periods (2H). The vertical LPF 543R makes vertical lowpass filtering of the R components based on the R components having the 0H delay, 1H delay and 2H delay, respectively, to extract vertical low-frequency components from the R components. The vertical HPF 544R makes vertical highpass filtering of the R components based on the R components having the 0H delay, 1H delay and 2H delay, respectively, to extract vertical high-frequency components from the R components. That is, since the edge of a picture appears as high frequency components of the video signals, the vertical LPF 543R will cut off vertical edge component from the video signal, while the vertical HPF 544R will extract vertical edge components from the video signals. The R component output from the vertical LPF 543R is supplied to the R-channel horizontal-component up converter 532R, while the R component output from the vertical HPF 544R is supplied to the R-channel vertical-component up converter 533R.

To process data synchronously with the up converter 517R provided in a main video signal path, the horizontal-component up converter 532R make up-conversion of the sampling frequency for the R component similarly to the up converter 517R. Similarly, the vertical-component up converter 533R makes up-conversion of the sampling frequency of the R component.

Note that the G-channel vertical filter 531G and B-channel vertical filter 531B are constructed similarly to the R-channel vertical filter 531R and thus will not be described any more. Also, since the G- and B-channel horizontal-component up converters 532G and 532B and G- and B-channel vertical-component up converters 533G and 533B are constructed similarly to the R-channel up converter and thus will not be described any further.

The horizontal-component R/G/B mixing circuit 534 is supplied, from the R-, G- and B-channel horizontal-component up converters 532R, 532G and 532B, with R-, G- and B-component video signals having vertical high-frequency components cut off therefrom. The horizontal-component R/G/B mixing circuit 534 mixes the R, G and B components at a predetermined mixing ratio to generate a luminance component. That is, the horizontal-component R/G/B mixing circuit 534 outputs a luminance signal having vertical high-frequency components cut off therefrom. The luminance signal from which the vertical high-frequency components have been cut off is supplied to the horizontal edge enhancement signal generation circuit 536.

The vertical-component R/G/B mixing circuit 535 is supplied, from the R-, G- and B-channel vertical-component up converters 533R, 533G and 533B, with R-, G- and B-component video signals indicative of the extracted vertical high-frequency components. The vertical-component R/G/B mixing circuit 535 mixes the R, G and B components at a predetermined mixing ratio to generate a luminance component. That is, the vertical-component R/G/B mixing circuit 535 outputs a luminance signal indicative of the extracted vertical high-frequency components. The luminance signal indicative of the extracted vertical high-frequency components is supplied to the vertical edge enhancement signal generation circuit 537.

As shown, the horizontal edge enhancement signal generation circuit 536 includes a horizontal bandpass filter (BPF) 551, gain control circuit 552 and a level limiter 553.

The luminance signal output from the horizontal-component R/G/B mixing circuit 534 is supplied to the horizontal BPF 551 where horizontal high-frequency components will be extracted from the luminance signal. That is, the horizontal BPF 551 outputs a signal indicative of only the extracted horizontal high-frequency components. In other words, the horizontal BPF 551 will output edge components indicating only a horizontal edge. The horizontal edge component outputs from the horizontal BPF 551 are supplied to the gain control circuit 552. The gain control circuit 552 multiplies the extracted horizontal edge components by a predetermined gain control coefficient to control the extent of the horizontal edge enhancement. The output from the gain control circuit 552 is supplied to the level limiter 553 which will make signal level limitation of the horizontal edge components higher than a predetermined signal level and output a final horizontal edge enhancement signal.

As shown, the vertical-component edge-enhancement signal generation circuit 537 includes a horizontal lowpass filter (LPF) 554, gain control circuit 555 and a level limiter 556.

The luminance signal output from the vertical-component R/G/B mixing circuit 535 is supplied to the horizontal LPF 554 where horizontal low-frequency components will be extracted from the luminance signal. That is, the horizontal LPF 554 outputs a signal indicative of only the extracted vertical high-frequency components. In other words, the horizontal LPF 554 will output edge components indicating only a vertical edge. The vertical edge component outputs from the horizontal LPF 554 are supplied to the gain control circuit 555. The gain control circuit 555 multiplies the extracted vertical edge components by a predetermined gain control coefficient to control the extent of the vertical edge enhancement. The output from the gain control circuit 555 is supplied to the level limiter 556 which will make signal level limitation of the vertical edge components higher than a predetermined signal level and output a final vertical edge enhancement signal.

The horizontal and vertical edge enhancement signals thus generated are supplied to the addition circuit 538 and gain control circuit 539.

The addition circuit 538 adds the horizontal and vertical edge enhancement signals together to mix the horizontal and vertical directions, and the gain control circuit 539 makes a final gain control of the edge-enhancement signals whose horizontal and vertical directions have thus been mixed to output a final edge-enhancement signal.

The edge-enhancement signal generated by the image enhancer 520 as above is added to a main video signal. The video signal having such an edge-enhancement signal added thereto becomes an edge-enhanced picture well defining the edge of an object.

It is well known that when a pulse-shaped rectangular wave signal is supplied to an analog amplification circuit composed of a transistor, operational amplifier or the like, the through rate of the amplification circuit at the rise is different from that at the fall of the signal. It is also known that a signal having passed through an analog filter composed of a resistor, capacitor, coil and the like will have the phase characteristic thereof distorted. Further, it is known that on the wires in a printed wiring board, a signal will be distorted by reflection or the like. For the above reasons, the waveform characteristic is distorted at the input and output of an analog circuit. For example, a rectangular wave signal as shown in FIG. 3A, after having passed through an analog amplifier or filter, will not show the same waveform characteristic at the rise and fall thereof because of a difference in through rate of the analog amplifier, for example, between at the rise and at the fall of the signal as shown in FIG. 3B.

Generally, in a video camera using the digital signal processing, light signal is acquired as an analog electrical signal from a CCD and subjected to A/D conversion to output a digital video signal. Therefore, an analog circuit has to be provided between the CCD and A/D conversion circuit. The analog circuit is composed of an active device such as a transistor, operational amplifier or the like and a passive device such as a resistor, capacitor, coil or the like, mounted on a printed wiring board. Therefore, a video signal picked up by the CCD will be distorted specifically to the analog system under the influence of the analog circuit and be converted, as stilled distorted, into digital data.

If the original signal having the waveform thereof distorted through the analog circuit as shown in FIG. 3B is passed to the image enhancer, there will be generated an edge-enhancement signal having the distortion of the extracted original signal waveform as shown in FIG. 3C. Addition of the distorted edge-enhancement signal to the original signal waveform will result in a signal whose distortion is rather enhanced as shown in FIG. 3D and thus in a picture remarkably distorted. Such a waveform distortion is a big problem to solve for a video camera, especially a broadcasting service-directed one for which a high image quality is required.

Thus, the edge enhancement should desirably be done of video signals after correction of their waveform having been distorted through the analog circuit.

To eliminate such a distortion, a waveform distortion due to the analog signal processing could be approximated by a digital filter and corrected by applying an inversion of the approximated distortion.

However, the waveform distortion caused by a difference in through rate of an analog amplifier between the rise and fall of the waveform is on the order of a few nanoseconds (ns) and equivalent to a length of time several to tens times shorter than a sampling period used for the digital signal processing in the video camera. Therefore, even if it is tried to approximate, by a digital filter, a distortion caused in an analog signal processing and apply an inversion of the approximated distortion, for example, in order to limit the distortion, the sampling frequency has to be raised several to tens times to configure such a digital filter, which will lead to a complicated circuit configuration and increased power consumption. Namely, it is very difficult to implement this method of distortion elimination.

DISCLOSURE OF THE INVENTION

Accordingly, the present invention has an object to overcome the above-mentioned drawbacks of the related art by providing an apparatus for, and a method of, enhancing the edges of video signals by eliminating the influence of a waveform distortion due to an analog signal processing or the like by the use of a small-scale hardware.

The present invention has another object to provide a video camera which enhances the edges of video signals by eliminating the influence of a waveform distortion due to an analog signal processing or the like by the use of a small-scale hardware.

The above object can be attained by providing an edge enhancing apparatus including according to the present invention:

a filter for extracting a horizontal high-frequency component from a video signal;

a signal level detecting means for discriminating between signal levels of the high frequency component detected by the filter;

a rise and fall detecting means for discriminating between leading and trailing edges of the video signal;

an enhancement signal generating means for generating an enhancement signal by multiplying the high frequency component extracted by the filter by a gain; and an adding means for adding the enhancement signal to the video signal;

the enhancement signal generating means generating the enhancement signal by changing the gain according to the result of discrimination between the signal levels of the high frequency component and the result of discrimination between the rise and fall of the video signal.

In the above edge enhancing apparatus, the edge-enhancement signal is generated by controlling the gain independently according to the result of discrimination between the signal levels of the horizontal high-frequency component of the video signal and the result of discrimination between the leading and trailing edges of the video signal.

Also in the above edge enhancing apparatus, the rise and fall detecting means detects the leading and trailing edges of the horizontal component of the video signal when the horizontal component of the video signal changes stepwise.

In the above edge enhancing apparatus, the edge-enhancement signal is generated by controlling the gain only for a part, changing stepwise in horizontal picture level.

The above object can be attained by providing an edge enhancing method including, according to the present invention, steps of:

extracting a horizontal high-frequency component from a video signal;

discriminating between signal levels of the extracted high-frequency component;

discriminating between leading and trailing edges of the video signal;

changing a gain to be given to the extracted high-frequency component according to the result of discrimination;

generating an enhancement signal by multiplying the extracted high-frequency component by the gain; and adding the enhancement signal to the video signal.

In the above edge enhancing method, the edge-enhancement signal is generated by controlling the gain independently according to the result of discrimination between the signal levels of the horizontal high-frequency component of the video signal and the result of discrimination between the leading and trailing edges of the video signal.

Also in the above edge enhancing method, the gain is controlled according to the result of discrimination between the signal levels of the horizontal high-frequency component of the video signal and the result of discrimination between the leading and trailing edges of the video signal when the horizontal high-frequency component of the video signal changes stepwise.

In the above edge enhancing method, the edge-enhancement signal is generated by controlling the gain only for a part, changing stepwise in horizontal picture level.

Also, the above object can be attained by providing a video camera including according to the present invention:

an imaging means for imaging an object to generate a video signal;

a filter for extracting a horizontal high-frequency component from the video signal generated by the imaging means;

a signal level detecting means for discriminating between signal levels of the high frequency component detected by the filter;

a rise and fall detecting means for discriminating between leading and trailing edges of the video signal;

an enhancement signal generating means for generating an enhancement signal by multiplying the high frequency component by a gain; and an adding means for adding the enhancement signal to the video signal;

the enhancement signal generating means generating the enhancement signal by changing the gain according to the result of discrimination between the signal levels of the high frequency component and the result of discrimination between the leading and trailing edges of the video signal.

In the above video camera, the edge-enhancement signal for enhancing the original video signal is generated by controlling the gain independently according to the result of discrimination between the signal levels of the horizontal high-frequency component of the video signal and the result of discrimination between the leading and trailing edges of the video signal.

Also in the above video camera, the rise and fall detecting means detects the leading and trailing edges of the horizontal component of the video signal when the horizontal component of the video signal changes stepwise.

In the above video camera, the edge-enhancement signal is generated by controlling the gain only for a part, changing stepwise in horizontal picture level.

BRIEF DESCRIPTION OF THE DRAWINGS

FIGS. 16A to 16I explain the signal processing in the rise/fall detection circuit.

BEST MODE FOR CARRYING OUT THE INVENTION

A video camera will be described herebelow as one of the embodiments of the present invention. It should be noted that for the convenience of the explanation of the video camera, red (R), green (G) and blue (B) signal channels (will be referred to simply as R, G and B channels, respectively) sharing the same processing circuit will be identified with a common reference to which R, G and B are suffixed, respectively.

FIRST EMBODIMENT (General Description of the Video Camera)

Figure 1:
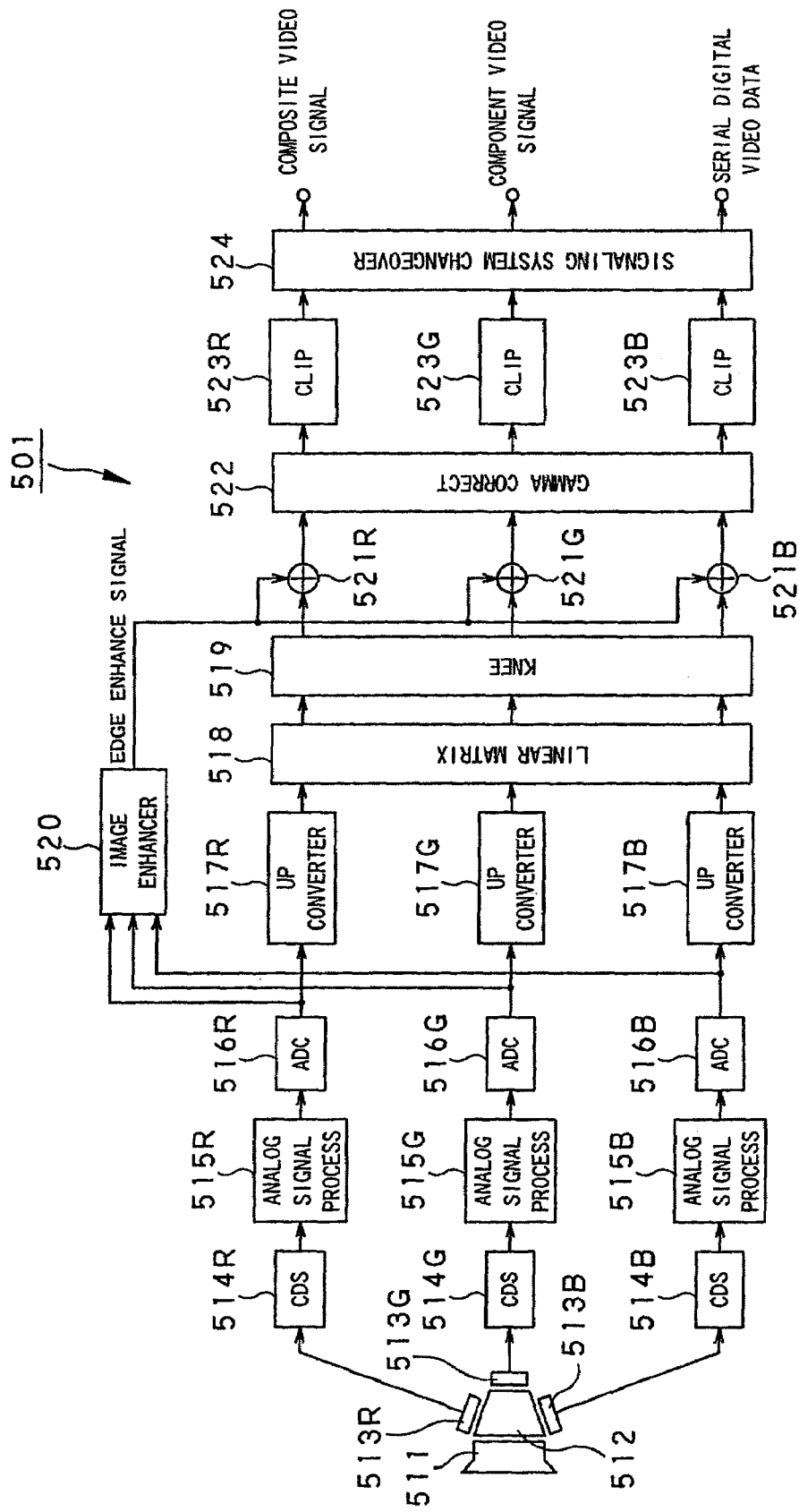
FIG. 1 is a block diagram of the conventional video camera.
Figure 2:
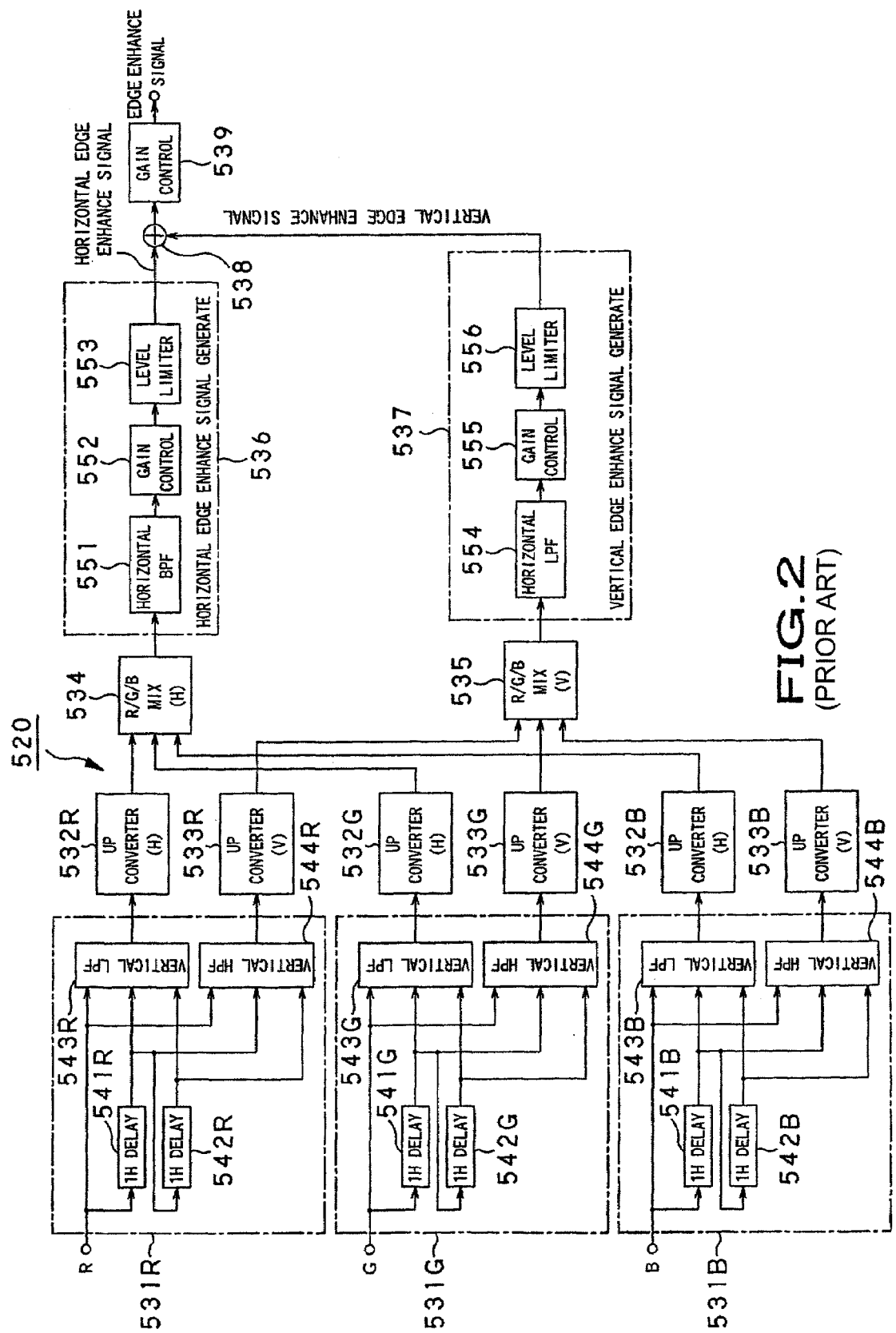
FIG. 2 is also a block diagram of the image enhancer in the conventional video camera shown in FIG. 1.
Figure 3A:
FIGS. 3A to 3D explain signal distortion caused in an analog signal processing circuit.
Figure 3B:
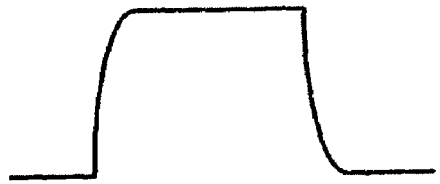
Figure 3C:
Figure 3D:
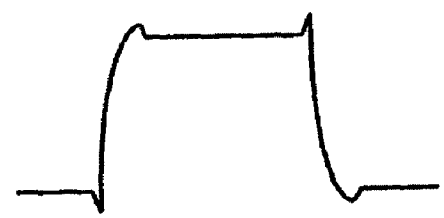
Figure 4:
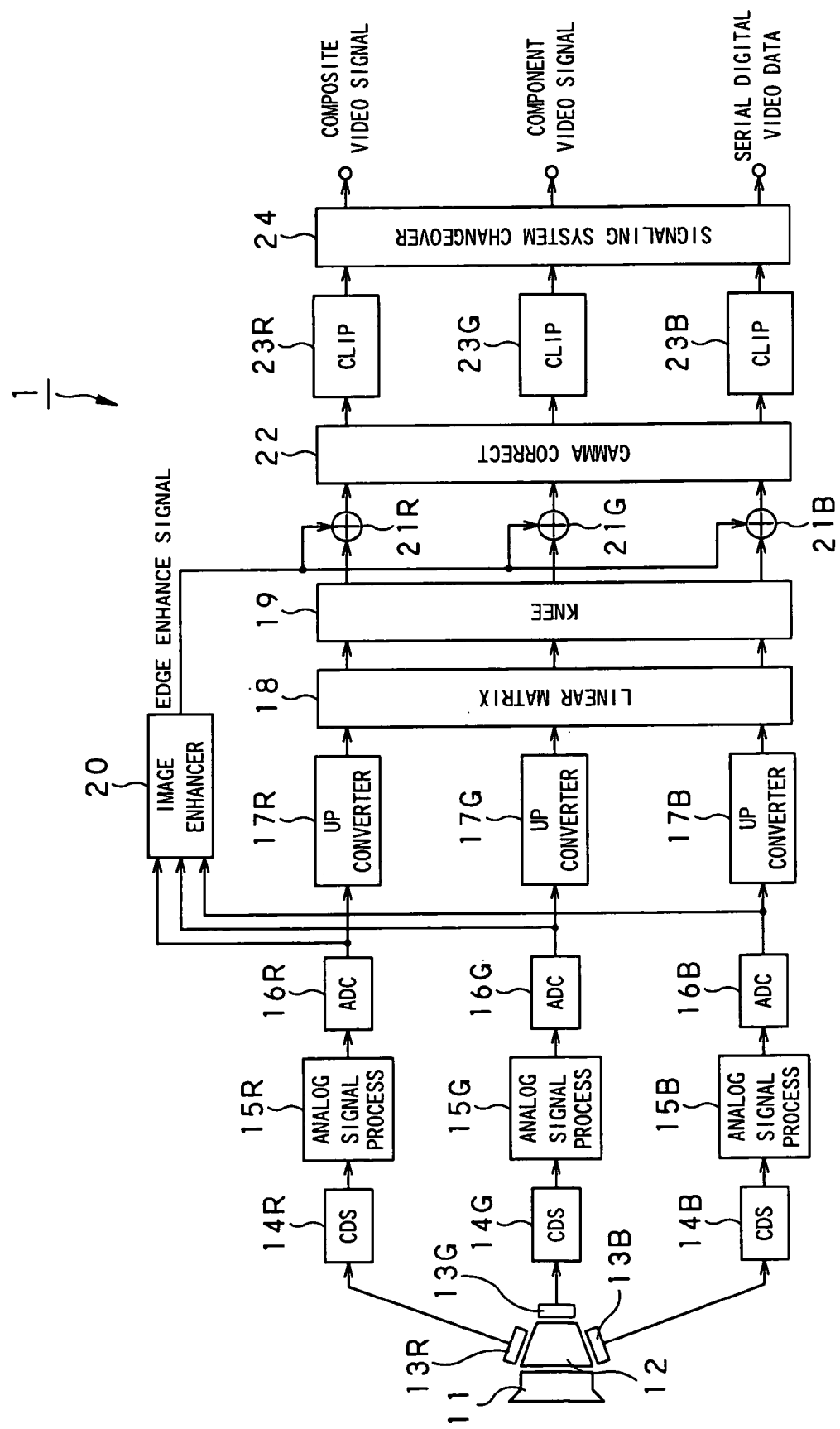
FIG. 4 is a block diagram of a first embodiment of the video camera according to the present invention.

Referring now to FIG. 4, there is illustrated in the form of a block diagram the first embodiment of the video camera according to the present invention. The video camera is generally indicated with a reference 1. The video camera 1 will be outlined herebelow with reference to FIG. 4.

As shown, the video camera 1 includes a pickup lens 11, color separation prism 12, three solid-state image sensing devices, 13R, 23G and 13B, such as a charge-coupled device (CCD) provided for R, G and B channels, respectively, three correlated double sampling circuits (CDS) 14R, 14G and 14B provided for the R, G and B channels, respectively, analog signal processing circuits 15R, 15G and 15B for the R, G and B channels, respectively, and analog-to-digital (A/D) conversion circuit (A/D converter) 16R, 16G and 16B provided for the R, G and B channels, respectively.

The video camera 1 also includes up converters 17R, 17G and 17B provided for the R, G and B channels, respectively, a linear matrix circuit 18, a kneeing circuit 19, an image enhancer 20, edge correction addition circuits 21R, 21G and 21B provided for the R, G and B channels, respectively, a gamma correction circuit 22, clipping circuits 23R, 23G and 23B provided for the R, G and B channels, respectively, and a signaling system changeover circuit 24.

Once the video camera 1 is put into action, light from an object is incident upon the pickup lens 11. The incident light is separated by the color separation prism 12 into three primary colors R, G and B. The color separation prism 12 has accurately fixed thereto the CDDs 13R, 13G and 13B corresponding to the primary colors R, G and B. The primary lights R, G and B separated by the color separation prism 12 are incident upon the CCDs 13R, 13G and 13B, respectively. Signals outputs from the CCDs 13R, 13G and 13B, indicating the primary colors R, G and B, respectively, are supplied to the CDS circuits 14R, 14G and 14B where the respective signals R, G and B will subjected to the correlated double sampling to generate analog video signals, respectively. The analog video signals are supplied to the analog signal processing circuits 15R, 15G and 15B, respectively, where they will be amplified to a predetermined signal level and subjected to various analog signal processing including black-and-white (B/W) balancing, B/W shading, flare correction, etc. The analog video signal outputs from the analog signal processing circuits 15R, 15G and 15B are supplied to the A/D converters 16R, 16G and 16B, respectively, where the analog video signals will be sampled at a predetermined rate and converted into digital video signals, respectively. The digital video signal outputs from the A/D converters 16R, 16G and 16B are supp/lied to the up converters 17R, 17G and 17B and image enhancer 20.

Each of the up converters 17R, 17G and 17B includes a zero insertion circuit and interpolating filter to raise the sampling rate for digital video signals and re-sample the digital video signals in order to prevent a return noise from taking place in a nonlinear processing which will be described in detail later. The digital video signal outputs from the up converters 17R, 17G and 17B are supplied to the linear matrix circuit 18.

The linear matrix circuit 18 makes color correction of the video signals to correct color reproduction error caused by the fact that the imaging characteristic of the CCD is different from the ideal one. The video signal outputs from the linear matrix circuit 18 are supplied to the kneeing circuit 19.

The kneeing circuit 19 makes gradation compression of high-luminance portions of the video signals according to a predetermined kneeing characteristic. The video signal outputs from the kneeing circuit 19 are supplied to the addition circuits 21R, 21G and 21B.

The image enhancer 20 extracts high frequency components from the video signals and multiplies the high frequency components by a gain coefficient to thereby produce edge-enhancement signals for enhancing the edges of the video signals. The edge-enhancement signal outputs from the image enhancer 20 are supplied to the addition circuits 21R, 21G and 21B.

The addition circuits 21R, 21G and 21B are provided to add edge-enhancement signals to the video signals to shape the waveforms of the video signal edges. The video signals having the waveforms thereof thus shaped by the addition circuits 21R, 21G and 21B are supplied to the gamma correction circuit 22 where the video signals will be subjected to gamma correction. The video signal outputs from the gamma correction circuit 22 are supplied to the clipping circuits 23R, 23G and 23B. The clipping circuits 23R, 23G and 23B clip the signals whose levels are over the standard television video signal level. The video signal outputs from the clipping circuits 23R, 23G and 23B are supplied to the signaling system changeover circuit 24. The signaling system changeover circuit 24 converts the video signals into ones necessary for the system configuration of the video camera 1, such as NTSC- or PAL-based analog composite video signal, analog component video signals such as Y (luminance) signal, R-Y signal and B-Y signal, serial digital video data or the like.

(Image Enhancer)

Figure 5:
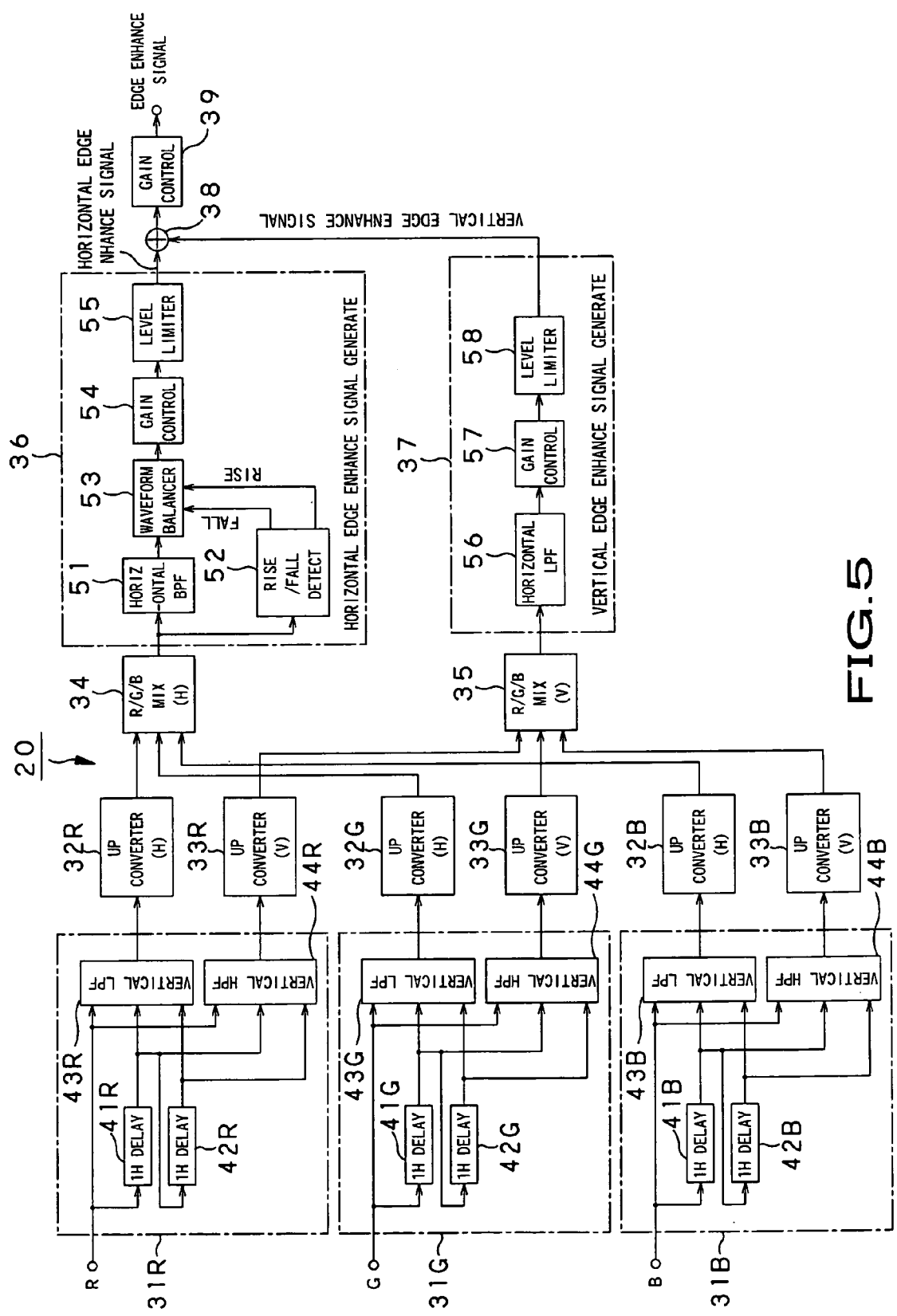
FIG. 5 is a block diagram of an image enhancer in the first embodiment of the video camera.

Next, the image enhancer 20 will be described below with reference to FIG. 5.

As shown, the image enhancer 20 includes three vertical filters 31R, 31G and 31B provided for the R, G and B channels, respectively, horizontal-component up converters 31R, 32G and 32B provided for the R, G and B channels, respectively, vertical-component up converters 33R, 33G and 33B provided for the R, G and B channels, respectively, a horizontal-component R/G/B mixing circuit 34, a vertical-component R/G/B mixing circuit 35, horizontal edge enhancement signal generation circuit 36, a vertical edge enhancement signal generation circuit 37, an addition circuit 38, and a gain control circuit 39.

The digital video signals on the R, G and B channels branched from the A/D converters 16R, 16G and 16B are supplied to the vertical filters 31R, 31G and 31B, respectively, of the image enhancer 20. That is, the digital video signal on the R, G and B channels branched from the A/D converter 16R is supplied to the R-channel vertical filter 31R, the digital video signal on the G channel branched from the A/D converter 16G is supplied to the G-channel vertical filter 31G, and the digital video signal on the B channel branched from the A/D converter 16B is supplied to the B-channel vertical filter 31B.

As shown, the R-channel vertical filter 31R includes a first 1H delay circuit 41R, second 1H delay circuit 42R, vertical lowpass filter (vertical LPF) 43R, and a vertical highpass filter (vertical HPF) 44R. The first 1H delay circuit 41R delays the R component one horizontal sync period (1H), the second 1H delay circuit 42R is supplied with the R component having been delayed the one horizontal sync period (1H) by the first 1H delay circuit 41R, and will delay the R component a further horizontal sync period (1H). Namely, the second 1H delay circuit 42R outputs the R component delayed a total of two horizontal sync periods (2H). The vertical LPF 43R and vertical HPF 44R supplied with an R component not delayed (0H delay), R component delayed one horizontal sync period (1H) and an R component delayed two horizontal sync periods (2H). The vertical LPF 43R makes vertical lowpass filtering of the R components based on the R components having the 0H delay, 1H delay and 2H delay, respectively, to extract vertical low-frequency components from the R components. The vertical HPF 44R makes vertical highpass filtering of the R components based on the R components having the 0H delay, 1H delay and 2H delay, respectively, to extract vertical high-frequency components from the R components. That is, since the edge of a picture appears as high frequency components of the video signals, the vertical LPF 43R will cut off vertical edge components from the video signals, while the vertical HPF 44R will extract vertical edge components from the video signals. The R component output from the vertical LPF 43R is supplied to the R-channel horizontal-component up converter 32R, while the R component output from the vertical HPF 44R is supplied to the R-channel vertical-component up converter 33R.

To process data synchronously with the up converter 17R provided in a main video signal path, the horizontal-component up converter 32R make up-conversion of the sampling frequency for the R component similarly to the up converter 17R. Similarly, the vertical-component up converter 33R makes up-conversion of the sampling frequency of the R component.

Note that the G-channel vertical filter 31G and B-channel vertical filter 31B are constructed similarly to the R-channel vertical filter 31R and thus will not be described any more.

Also, since the G- and B-channel horizontal-component up converters 32G and 32B and G- and B-channel vertical-component up converters 33G and 33B are constructed similarly to the R-channel up converter and thus will not be described any further.

The horizontal-component R/G/B mixing circuit 34 is supplied, from the R-, G- and B-channel horizontal-component up converters 32R, 32G and 32B, with R-, G- and B-component video signals having the vertical high-frequency components cut off therefrom. The horizontal-component R/G/B mixing circuit 34 mixes the R, G and B components at a predetermined mixing ratio to generate a luminance component. That is, the horizontal-component R/G/B mixing circuit 34 outputs a luminance signal having vertical high-frequency components cut off therefrom. The luminance signal from which the vertical high-frequency components have been cut off is supplied to the horizontal edge enhancement signal generation circuit 36.

The vertical-component R/G/B mixing circuit 35 is supplied, from the R-, G- and B-channel vertical-component up converters 33R, 33G and 33B, with R-, G- and B-component video signals indicative of the extracted vertical high-frequency components. The vertical-component R/G/B mixing circuit 35 mixes the R, G and B components at a predetermined mixing ratio to generate a luminance component. That is, the vertical-component R/G/B mixing circuit 35 outputs a luminance signal indicative of the extracted vertical high-frequency components. The luminance signal indicative of the extracted vertical high-frequency components is supplied to the vertical edge enhancement signal generation circuit 37.

As shown, the horizontal edge enhancement signal generation circuit 36 includes a horizontal bandpass filter (BPF) 51, rise/fall detection circuit 52, waveform balancer 53, gain control circuit 54 and a level limiter 55.

The luminance signal output from the horizontal-component R/G/B mixing circuit 34 is supplied to the horizontal BPF 51 and rise/fall detection circuit 52 of the horizontal edge enhancement signal generation circuit 36.

The horizontal BPF 51 makes bandpass filtering of the luminance signal having vertically been lowpass-filtered to extract horizontal high-frequency components from the luminance signal. That is, the horizontal BPF 51 will output a signal indicative of only the extracted horizontal high-frequency components, namely, a signal indicative of the horizontal edge components.

The rise/fall detection circuit 52 detects whether the supplied luminance signal rises or falls, namely, whether the luminance signal has increased or decreased. At this time, the rise/fall detection circuit 52 is adjusted in sensitivity to increase and decrease of a luminance signal not to detect any rise or fall of the luminance signal having been increased or decreased only slightly and of a luminance signal having a high frequency-caused variation of the rise and fall. The rise/fall detection circuit 52 outputs a rise signal whose level is high (H) when the luminance signal rises, and a fall signal whose level is high (H) when the luminance signal is falls. It should be noted that the rise/fall detection circuit 52 outputs a rise signal and fall signal both being low (L) when the luminance signal neither rises nor falls, namely, when the level of the luminance signal is flat or the increasing and decreasing of the luminance signal are varied due to a high frequency.

Note that the configuration of the rise/fall detection circuit 52 will be described in detail later.

The waveform balancer 53 multiplies the horizontal edge component output from the horizontal BPF 51 by a predetermined gain coefficient to shape the waveform. At this time, an absolute value of the gain coefficient by which the horizontal edge components are multiplied is selectively controlled depending upon whether the condition is either of the following ones (1) and (2):

(1) The horizontal component of the luminance signal rises or falls, or it neither rises nor falls.

(2) The signal level of the horizontal edge component is positive (white) or negative (black).

More specifically, the waveform balancer 53 determines the states of the rise and fall signals from the rise/fall detection circuit 52 and whether the signal level of the horizontal edge component is positive or negative to switch the gain coefficient magnitude from one to another.

The edge component shaped in waveform by the waveform balancer 53 as above is supplied to a gain control circuit 54. It should be noted that an example circuit configuration of the waveform balancer 53 and examples of the gain will be described in detail later.

The gain control circuit 54 multiplies the horizontal edge component by a predetermined gain control coefficient to adjust the extent of the horizontal edge enhancement. The output from the gain control circuit 54 is supplied to the level limiter 55. The level limiter 55 limits the signal level of a part of the edge component from the gain control circuit 54, which exceeds a predetermined signal level, to output a final horizontal edge enhancement signal.

The vertical edge enhancement signal generation circuit 37 includes a horizontal lowpass filter (LPF) 56, gain control circuit 57 and a level limiter 58.

The luminance signal output from the vertical-component R/G/B mixing circuit 35 is supplied to the horizontal LPF 56 where a horizontal low-frequency component will be extracted from the luminance signal. That is, the horizontal LPG 56 will output an edge component indicative of only a vertical edge. The vertical edge component output from the horizontal LPF 56 is supplied to the gain control circuit 57. The gain control circuit 57 multiplies the extracted vertical edge component by a predetermined gain control coefficient to adjust the extent of the vertical edge enhancement. The output from the gain control circuit 57 is supplied to the level limiter 58. The level limiter 58 limits a part of the vertical edge component, which exceeds a predetermined signal level, and outputs a final vertical edge enhancement signal.

The horizontal and vertical edge enhancement signals thus generated are supplied to the addition circuit 38 and gain control circuit 39.

The addition circuit 38 adds the horizontal and vertical edge enhancement signals together to mix the horizontal and vertical directions, and the gain control circuit 39 makes a final gain control of the edge-enhancement signals whose horizontal and vertical directions have thus been mixed to output a final edge-enhancement signal.

The edge-enhancement signal generated by the image enhancer 20 as above is added to a main video signal. The video signal having such an edge-enhancement signal added thereto becomes an edge-enhanced picture well defining the edge of an object.

(Waveform Balancer)

Next, the waveform balancer 53 will be described in further detail below:

The waveform balancer 53 shapes the waveform of the horizontal edge component output from the horizontal BPF 51 by multiplying it by a predetermined gain coefficient. At this time, the magnitude of the gain coefficient by which the horizontal edge component is multiplied is selectively controlled depending upon whether the condition is either of the above ones (1) and (2).

That is, the gain coefficient magnitude is selectively controlled depending upon whether the condition is either of the following ones:

(1) The horizontal component of the luminance signal rises or falls, or it neither rises nor falls.

(2) The signal level of the horizontal edge component is positive (white) or negative (black).

The waveform balancer 53 controls the gain coefficient by which the horizontal edge component is multiplied is selectively controlled depending upon whether the condition is either of the above ones (1) and (2). Depending upon whether the condition is either of the ones, it sets a gain for an opposite characteristic to a stepwise response distortion characteristic of the analog signal processing circuit 15.

For the opposite characteristic to the stepwise response distortion characteristic of the analog signal processing circuit 15, each gain is set as follows:

When the horizontal component of the luminance signal rises and the signal level of the horizontal edge component is positive (white), there will be set a gain coefficient larger than a predetermined value ("1", for example) (will be referred to as "rise/white-side gain" hereunder).

When the horizontal component of the luminance signal rises and the signal level of the horizontal edge component is negative (black), there will be set a gain coefficient equal to or smaller than a predetermined value ("1", for example) (will be referred to as "rise/black-side gain" hereunder).

When the horizontal component of the luminance signal falls and the signal level of the horizontal edge component is positive (white), there will be set a gain coefficient equal to or smaller than a predetermined value ("1", for example) (will be referred to as "fall/white-side gain" hereunder).

When the horizontal component of the luminance signal falls and the signal level of the horizontal edge component is negative (black), there will be set a gain coefficient larger than a predetermined value ("1", for example) (will be referred to as "fall/black-side gain" hereunder).

When the horizontal component of the luminance signal neither rises nor falls, there will be set a gain coefficient of a predetermined value ("1", for example).

The circuit configuration of the waveform balancer 53 capable of such a gain coefficient setting will be described in detail below with reference to FIG. 6.

Figure 6:
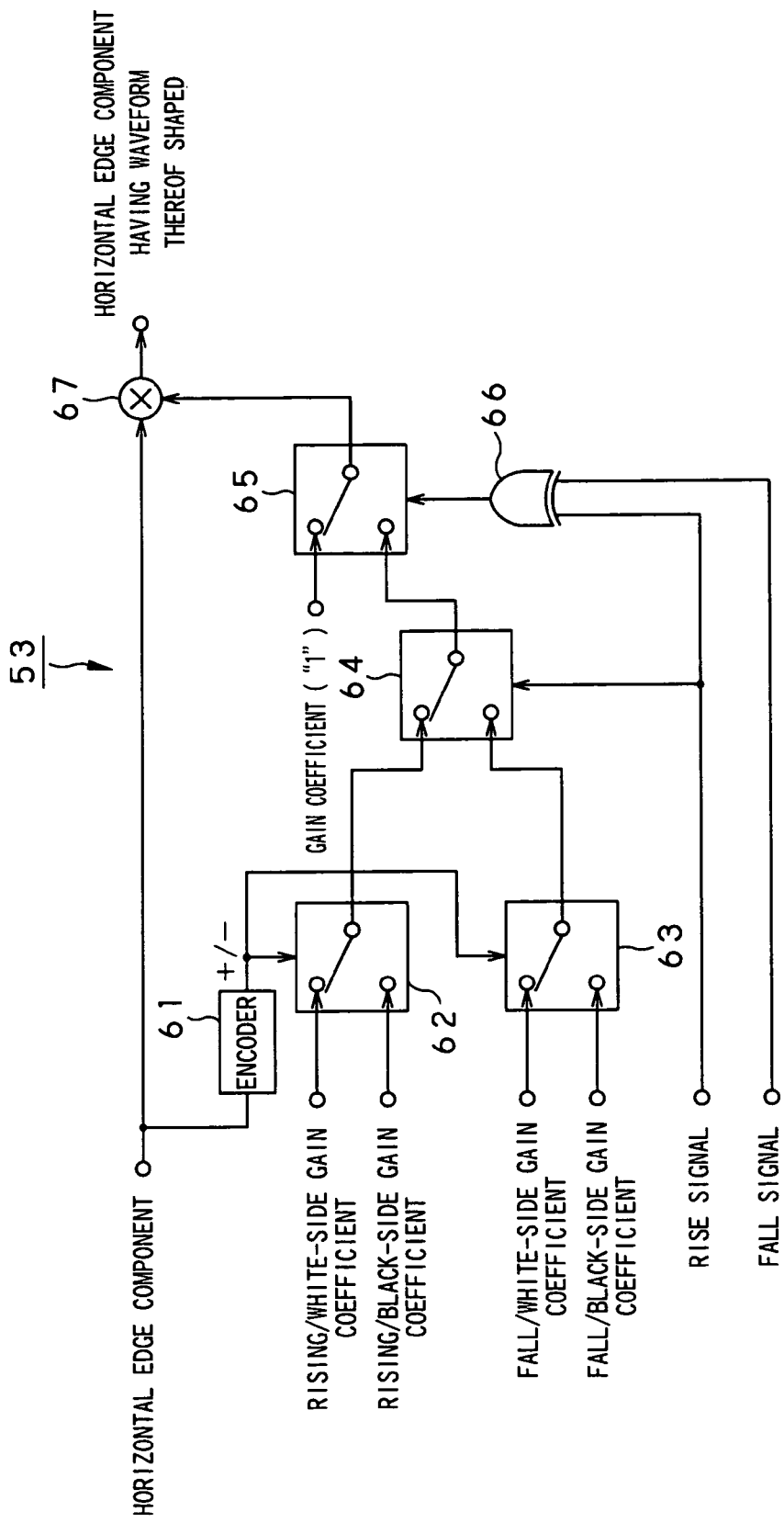
FIG. 6 shows the construction of the waveform balancer used in the image enhancer in FIG. 5.

The waveform balancer 53 shown in FIG. 6 includes an encoder 61, first to fourth selectors 62 to 65, EX-OR (exclusive-OR) circuit 66 and a multiplier 67.

The encoder 61 discriminates between signs (positive/negative) of the horizontal edge component output from the horizontal BPF 51. When the sign is "plus (positive)", the encoder 61 will provide a "high (H)" output. Alternatively, when the sign is "minus (negative)", the encoder 61 will provide a "low (L)" output.

The first selector 62 selectively outputs a rise/white-side gain or a rise/black-side gain depending upon the output from the encoder 61. When the output from the encoder 61 is "H", the first selector 62 will select and output the rise/white-side gain. When the output from the encoder 61 is "L", the first selector 62 will select and output the rise/black-side gain.

The second selector 63 selectively outputs a fall/white-side gain or a fall/black-side gain depending upon the output from the encoder 61. When the output from the encoder 61 is "H", the second selector 63 will select and output the fall/white-side gain. When the output from the encoder 61 is "L", the second selector 63 will select and output the fall/black-side gain.

The third selector 64 selectively outputs an output from the first selector 62 or an output from the second selector 63 depending upon a rise signal output from the rise/fall detection circuit 52. When the rise signal is "H", namely, when the horizontal component of the luminance signal is rising, the third selector 64 will select and output the output from the first selector 62. When the rise signal is "L", namely, when the horizontal component of the luminance signal is in any other state than the rising, the third selector 64 will select and output the output from the second selector 63.

The EX-OR circuit 66 will provide an "H" output when both the rise and fall signals are "H" or "L". When any one of the rise and fall signals is "H", the EX-OR circuit 66 will provide an "L" output.

The fourth selector 65 selectively outputs a gain coefficient as large as the predetermined value or an output from the third selector 64 depending upon all output from the EX-OR circuit 66. When the output from the EX-OR circuit 66 is "H", namely, when both the rise and fall signals are "H" or "L", the fourth selector 65 will select and output a gain coefficient as large as the predetermined value. When the output from the EX-OR circuit 66 is "L", namely, when only either the rise or fall signal is "H", the fourth selector 65 will select and output the output from the third selector 64.

The multiplier 67 multiplies the horizontal edge component output from the horizontal BPF 51 and gain coefficient output from the fourth selector 65 to shape the waveform.

The waveform balancer 53 constructed as above works effectively as will be described below with reference to FIGS. 7A to 7G.

Figure 7A:
FIGS. 7A to 7G explain the effect of the waveform shaping by the waveform balancer.
Figure 7B:
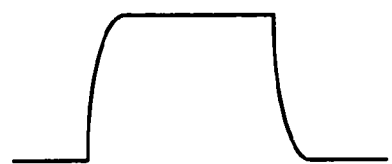

Assume here that a video signal whose horizontal component appears as a rectangular waveform as shown in FIG. 7A is supplied to the video camera 1. In this case, the video signal is digitized to have the waveform thereof distorted due to the analog signal processing as shown in FIG. 7B for example. As shown, when the signal rises, it is initially distorted largely and then the distortion is smaller and smaller. Also, when the signal falls, it is initially distorted largely and then the distortion is smaller and smaller.

Figure 7C:
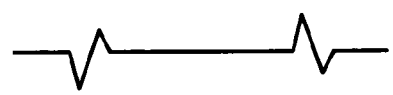

By extracting a high frequency component from the signal distorted as above to extract a horizontal edge component, a signal of one wavelength, overshooting and undershooting as shown in FIG. 7C, will appear at both rising and falling. At this time, the extracted edge component will have a signal level higher at the negative side than at the positive side at the leading edge and a signal level higher at the positive side than the negative side at the trailing edge.

Figure 7D:
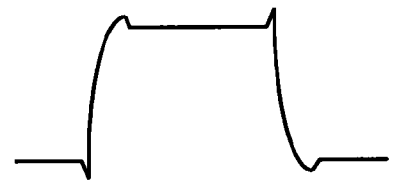

Assume here that the horizontal edge component is added to the original video signal, the distortion of the input waveform will further be enhanced as shown in FIG. 7D.

That is to say, the undershooting is larger than the overshooting at the rising side while the overshooting is larger than the undershooting at the falling side, resulting in an ill-balanced signal.

To avoid the above, the waveform balancer 53 multiplies the edge component by a gain coefficient smaller than the predetermined value "1" when the horizontal edge component is at the black side at the time of rising of the video signal while multiplying it by a gain coefficient larger than the predetermined value "1" when the horizontal edge component is at the white side at the time of rising of the video signal. On the other hand, the waveform balancer 53 multiplies the edge component by a gain coefficient larger than the predetermined value "1" when the horizontal edge component is at the black side at the time of falling of the video signal while multiplying the edge component by a gain coefficient smaller than the predetermined value "1" when the horizontal edge component is at the white side at the time of falling of the video signal.

Figure 7E:
Figure 7F:
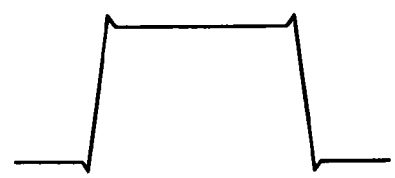

By selecting a gain coefficient as above, the horizontal edge component as shown in FIG. 7C is shaped to have an opposite waveform to that of the original horizontal edge component as shown in FIG. 7E. By adding to the horizontal edge component to the original video signal, the waveform distortion will be corrected as shown in FIG. 7F.

By shaping the waveform of the horizontal edge component by the waveform balancer 53 as above, it is possible to correct any waveform distortion due to the analog signal processing in the analog circuit. It should be noted that the gain coefficient is changed in value depending upon whether the signal level of the horizontal edge component is positive or negative as in the foregoing but the gain coefficient selection may not be done taking the zero level as a threshold. Also, a plurality of thresholds for the signal level of the horizontal edge component may be set and the magnitude of the gain coefficient may be changed gradually according to the signal level of each horizontal edge component.

Figure 7G:
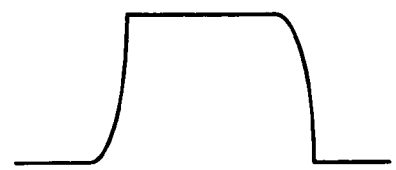

Note that depending upon the characteristic of the analog signal processing circuit, the video signal whose horizontal component appears as a rectangular waveform as shown in FIG. 7A is digitized to have the waveform thereof distorted due to the analog signal processing as shown in FIG. 7G for example. More particularly, when the signal rises, it is initially distorted largely and then the distortion is smaller and smaller. Also, when the signal falls, it is initially distorted largely and then the distortion is smaller and smaller. In such a case, the gain coefficient by which the edge component is multiplied at the white side should be swapped with that at the black side. Namely, the horizontal edge component should be multiplied by a gain coefficient larger than the predetermined value "1" by the waveform balancer 53 when it is at the black side at the time of rising of the video signal, while it be multiplied by a gain coefficient smaller than the predetermined value "1" when it is at the white side at the time of rising of the video signal. On the other hand, the horizontal edge component should be multiplied by a gain coefficient smaller than the predetermined value "1" by the waveform balancer 43 when it is at the black side at the time of falling of the video signal, while it be multiplied by a gain coefficient larger than the predetermined value "1" when it is at the white side at the time of falling of the video signal.

(Rise/fall Detection Circuit)

Next, the rise/fall detection circuit 52 will be described. It should be noted that the rise/fall detecting method is known from the disclosure in the U.S. Pat. Nos. 6,043,853 and 5,638,134, Japanese Unexampled Patent Application No. 317253 of 1996, etc.

Figure 8:
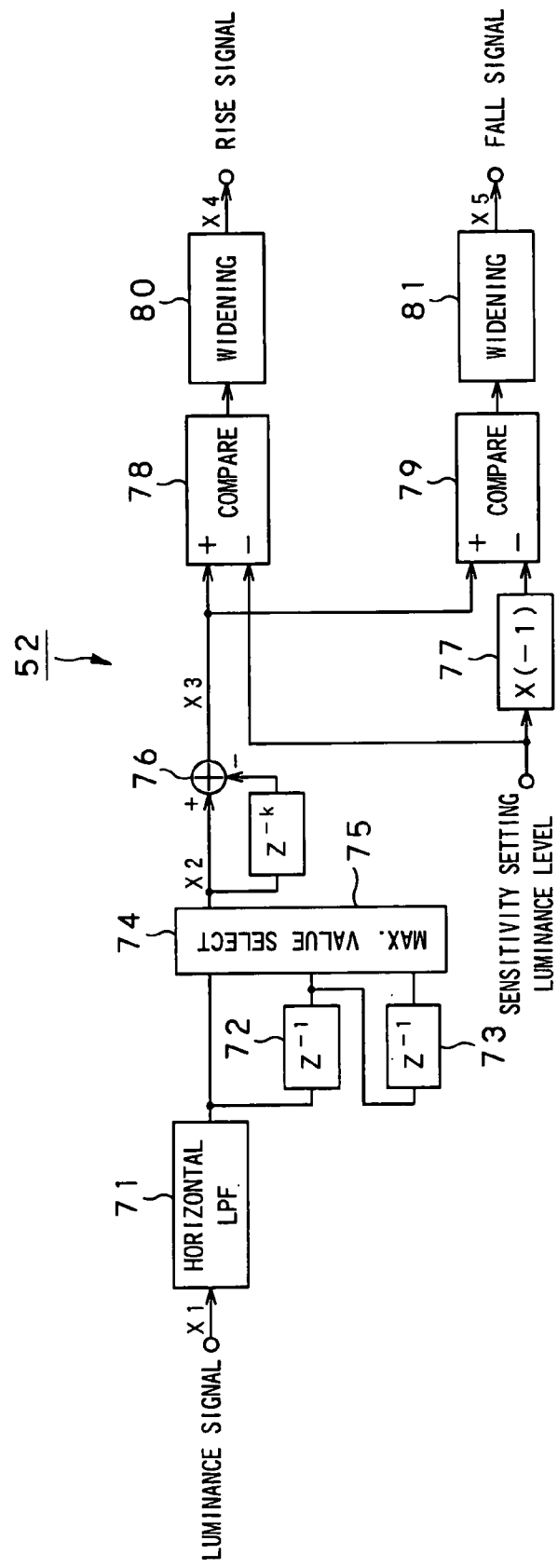
FIG. 8 is a block diagram of a rise/fall detection circuit used in the image enhancer.

Referring now to FIG. 8, the rise/fall detection circuit 52 is illustrated in the form of a block diagram.

As shown, the rise/fall detection circuit 52 includes a horizontal lowpass filter (LPF) 71, first delay element 72, second delay element 73, maximum value selection circuit 74, third dely element 75, subtraction circuit 76, inversion circuit 77, first comparison circuit 78, second comparison circuit 79, first widening circuit 80 and a second widening circuit 81.

The horizontal LPF 71 is supplied with a luminance signal output from the horizontal component R/G/B mixing circuit 34, and cuts off a high frequency component from the luminance signal. The horizontal LPF 71 should preferably include a set of filter coefficients including no negative ones. If any negative filter coefficient is included, rigging will take place which will possibly cause a false detection. Also, the horizontal LPF 71 should preferably have a wide rejection band but since too large a number of taps will lead to an increased circuit scale, the number of filter coefficients in the set is taken herein as (1, 2, 3, 4, 4, 4, 4, 4, 3, 2, 1)/32, for example. In this case, a zero point will be placed at ⅛ of the sampling frequency, and the lowpass filter 71 will have such a characteristic that a frequency higher than the one eighth is the rejection band.

The first delay element 72 delays the signal output from the horizontal LPF 71 one unit time. The unit time refers herein to one clock in the digital signal processing. The second delay element 73 delays, a further unit time, the signal having been delayed by the first delay element 72. The maximum value selection circuit 74 compares the non-delayed signal from the horizontal LPF 71, the signal supplied from the first delay element 72 and having been delayed one unit time and the signal supplied from the second delay element 73 and having been delayed two unit times to select a maximum value. Noise component is further reduced from the signal through this selection of the maximum value. It should be noted the two delay elements are referred to above but any number of delay elements may be used. The output from the maximum value selection circuit 74 is supplied to the third delay element 75 and subtraction circuit 76.

The third delay element 75 delays the output from the maximum value selection circuit 74 a number k (a positive integer) of unit times. The subtraction circuit 76 subtracts the signal supplied from the third delay circuit 75 and having been delayed the number k of unit times from the signal output from the maximum value selection circuit 74. The result of subtraction is supplied to the first and second comparison circuits 78 and 79.

The inversion circuit 77 multiplies a preset sensitivity setting luminance level by −1 and outputs a sign-inverted value of the sensitivity setting luminance level.

The first comparison circuit 78 compares the preset sensitivity setting luminance level and the supplied result of subtraction. When the result of comparison shows that the result of subtraction is larger than the sensitivity setting luminance level, the first comparison circuit 78 will output a pulse signal whose level is "H". The pulse signal output from the first comparison circuit 78 is supplied to the first widening circuit 80.

The second comparison circuit 79 compares the sign-inverted signal of the sensitivity setting luminance level output from the inversion circuit 77 and the supplied result of subtraction. When the result of comparison shows that the result of subtraction is smaller than the sign-inverted signal of the sensitivity setting luminance level, the second comparison circuit 79 will output a pulse signal whose level is "H". The pulse signal output from the second comparison circuit 79 is supplied to the second widening circuit 81.

The first and second widening circuits 80 and 81 widen the "H" portions of the supplied pulse signals along the time base. Thus, an output signal from the first widening circuit 80 is a rise signal, while an output signal from the second widening circuit 81 is a fall signal.

Figure 9:
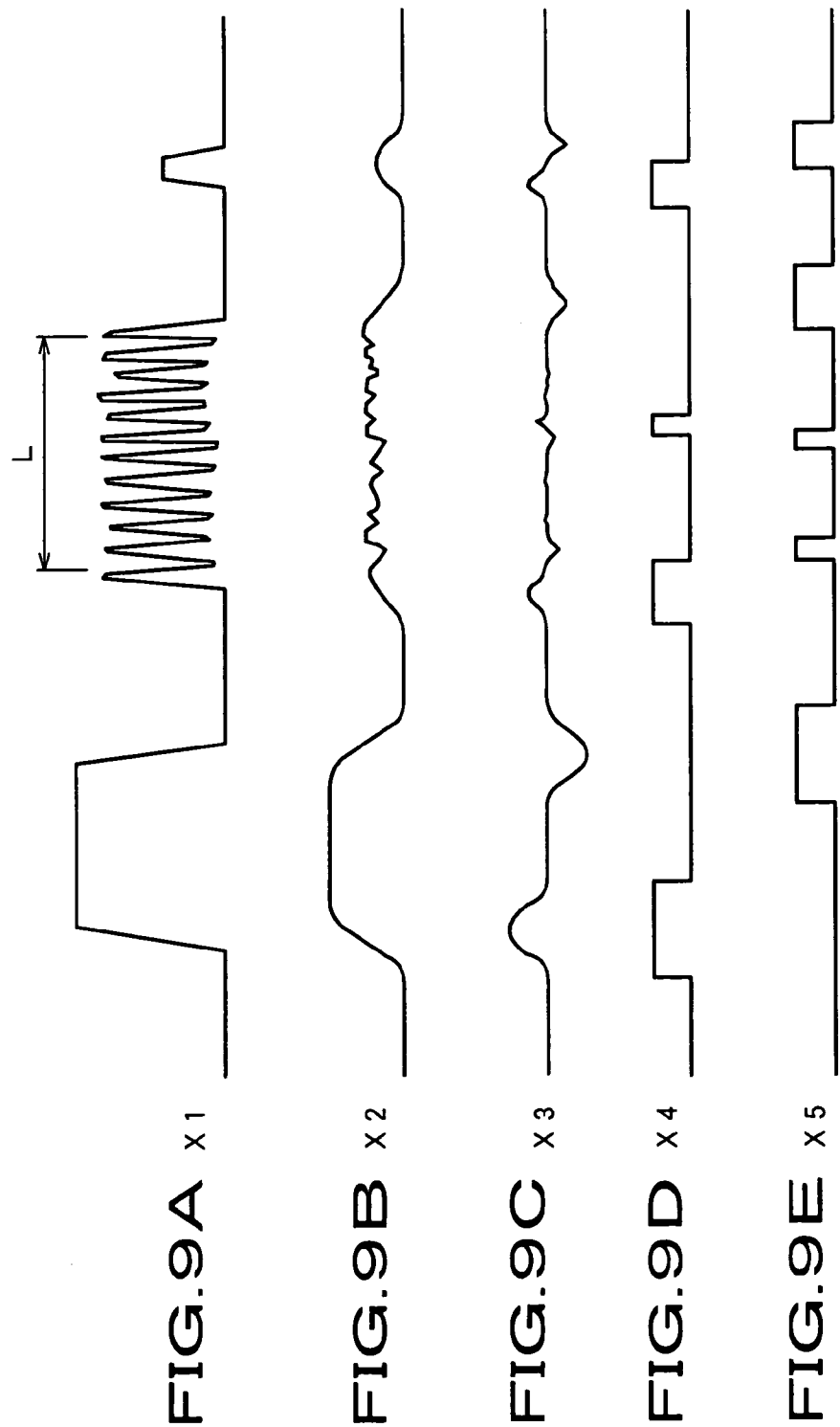
FIGS. 9A to 9E explain the signal processing in the rise/fall detection circuit.

Next, signal processing operations made in the rise/fall detection circuit 52 will be described in detail below with reference to waveform charts shown in FIGS. 9A to 9E. It should be noted that FIGS. 9A to 9E show signal waveforms detected at various points in the rise/fall detection circuit 52 but the same time base is used for the waveforms with the group delay caused in the digital signal processing being considered to include no time. FIG. 9A shows a waveform at a point X1 in FIG. 8, FIG. 9B shows a waveform at a point X2 in FIG. 8, FIG. 9C shows a waveform at a point X3 in FIG. 8, FIG. 9D shows a waveform at a point X4 in FIG. 8, and FIG. 9E shows a waveform at a point X5 in FIG. 8.

First it is assumed that the rise/fall detection circuit 52 is supplied with a step-like pulse waveform followed by a luminance signal having a pattern of small vertical stripes as shown in FIG. 9A.

The luminance signal has the high frequency and noise components thereof attenuated by the horizontal LPF 71 and maximum value selection circuit 74 to have a signal waveform as shown in FIG. 9B.

The above signal is supplied to the subtraction circuit 76 where the signal point delayed a number k of clocks by the third delay element 75 is subtracted from a point being currently in consideration (output from the maximum value selection circuit 74) to generate a signal indicative of an increase (or decrease) of the luminance level as shown in FIG. 9C. That is, the signal has a waveform which will be positive when the original luminance signal rises while being negative when the original luminance signal is falls.

Note that in order to prevent any erroneous detection due to the noise component, a difference from a signal preceding the number k of clocks is detected without detecting any increase (or decrease) by computation of a difference from a signal preceding one clock. The number k is set to about 12 for example when it is intended to drive a CCD having 500,000 pixels (having 960 horizontal effective-picture pixels and 483 vertical effective-picture pixels) with a horizontal frequency of 18 MHz and process signals from the CCD with a frequency doubled by up-conversion (36 MHz). The number k should desirably be somehow variable since it varies depending upon the number of CCD pixels and processing frequency.

The first comparison circuit 78 compares the output from the addition circuit 76 with the sensitivity setting luminance level and digitizes the result of comparison to generate a pulse signal whose level is "H" when the luminance signal rises. The sensitivity setting luminance level is set to a value for no noise-caused erroneous detection. The pulse signal output from the first comparison circuit 78 is increased in "H" duration by the first widening circuit 80 and provided as a rise signal as shown in FIG. 9D.

The second comparison circuit 79 compares the output from the addition circuit 76 with an inverted value of the sensitivity setting luminance level and digitizes the result of comparison to generate a pulse signal whose level is "H" when the luminance signal rises. The pulse signal output from the second comparison circuit 79 is increased in "H" duration by the second widening circuit 81 and provided as a rise signal as shown in FIG. 9E.

In the video camera 1, the first embodiment of the present invention, a horizontal high frequency component is extracted from a video signal, multiplied by a gain coefficient. The gain coefficient by which the edge enhancement signal to be generated is to be multiplied is varied according to the signal level of the extracted horizontal high frequency component of the video signal and also to leading and trailing edges of the video signal.

For example, the gain coefficient is made larger than "1" when the signal level of the extracted high frequency signal at the leading edge of the video signal is positive, while it is made equal to or smaller than "1" when the signal level of the high frequency component at the leading edge of the video signal is negative. Also, the gain coefficient is made equal to or smaller than "1" when the signal level of the high frequency component at the trailing edge of the video signal is positive while it is made larger than "1" when the signal level of the high frequency component at the trailing edge of the video signal is negative.

In the video camera 1, the first embodiment of the present invention, the edge component of an image can be enhanced by a small-scale circuit configuration while correcting a horizontal waveform distortion of the video signal due to the signal processing in any analog circuit or the like.

SECOND EMBODIMENT

Next, the second embodiment of the video camera according to the present invention will be described.

To correct a waveform distortion due to a signal processing in an analog circuit in the first embodiment, an edge enhancement signal is multiplied by a gain to invert the waveform distortion. However, since the waveform shaping is a nonlinear processing, a harmonic component an integral multiple of times higher than a frequency component of the waveform-shaped signal takes place, possibly causing a return noise. Such a return noise will remarkably develop when a picture having a pattern of small stripes is nonlinearly processed. Thus, waveform shaping of an edge enhancement signal in case a picture has a pattern of small stripes in a duration L as in FIG. 9A for example will cause a return noise-caused distortion to be rather remarkable than when a waveform distortion due to a signal processing in an analog circuit is corrected. The distortion of a picture having such a pattern of small stripes due to an imbalance between the rise and fall of the waveform is not remarkable as compared with a video signal like a square wave. Accordingly, in the second embodiment of the video camera according to the present invention, an edge enhancement signal is shaped in waveform only when a video signal appears as a step-like waveform while a portion of the video signal having a pattern of small stripes is not subjected to the waveform shaping. It should be noted that the second embodiment is similar to the first one except for the image enhancer and so any general description thereof will not be given below. Also, it should be noted that in the description of the second embodiment of the video camera, the same circuits as those in the first embodiment will be indicated with the same references as in the first embodiment and will not be described in detail.

(Image Enhancer)

Figure 10:
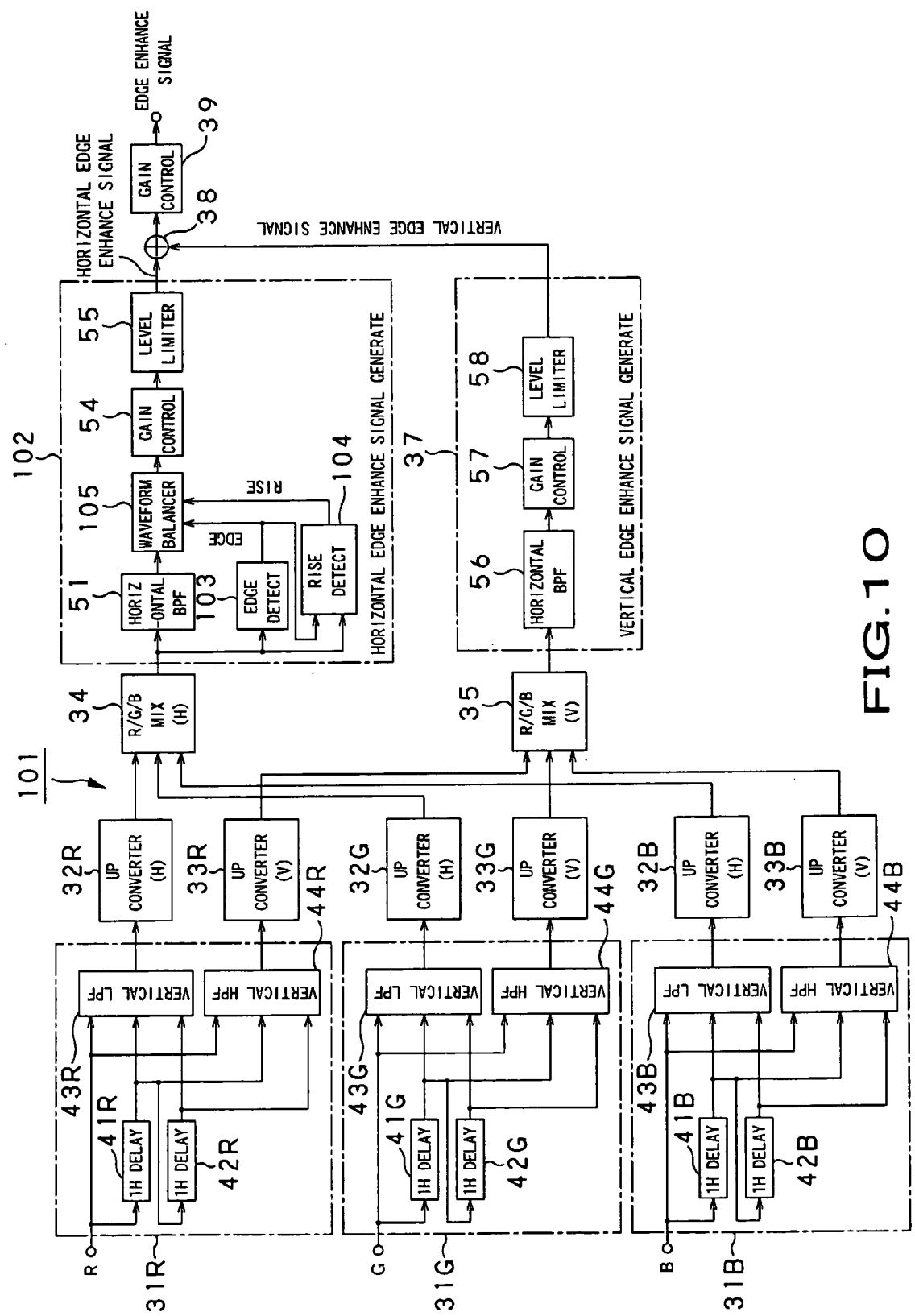
FIG. 10 is a block diagram of an image enhancer used in a second embodiment of the video camera according to the present invention.

Referring now to FIG. 10, there is illustrated in the form of a block diagram the image enhancer used in the second embodiment of the video camera according to the present invention. The image enhancer is generally indicated with a reference 101.

As shown, the image enhancer 101 includes three vertical filters 31R, 31G and 31B provided for the R, G and B channels, respectively, horizontal-component up converters 31R, 32G and 32B provided for the R, G and B channels, respectively, vertical-component up converters 33R, 33G and 33B provided for the R, G and B channels, respectively, a horizontal-component R/G/B mixing circuit 34, a vertical-component R/G/B mixing circuit 35, horizontal edge enhancement signal generation circuit 102, a vertical edge enhancement signal generation circuit 37, an addition circuit 38, and a gain control circuit 39.

The horizontal R/G/B mixing circuit 34 supplies the luminance signal having a vertical high frequency component thereof cut off to the horizontal-component edge enhancement signal generation circuit 102.

As shown, the horizontal edge enhancement signal generation circuit 102 includes a horizontal bandpass filter (BPF) 51, edge detection circuit 103, rise detection circuit 104, waveform balancer 105, gain control circuit 54 and a level limiter 55.

The luminance signal output from the horizontal-component R/G/B mixing circuit 34 is supplied to the horizontal BPF 51, edge detection circuit 103 and rise detection circuit 104 of the horizontal edge enhancement signal generation circuit 102.

The luminance signal output from the horizontal-component R/G/B mixing circuit 34 is supplied to the horizontal BPF 51, edge detection circuit 103 and rise detection circuit 104 of the horizontal edge enhancement signal generation circuit 102.

Figure 11:
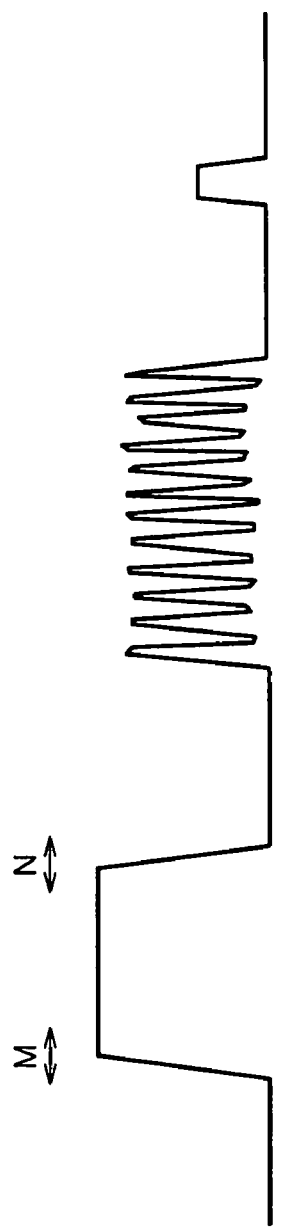
FIG. 11 explains the leading and trailing edges of the step-like signal waveform.

The edge detection circuit 103 extracts a change point of the luminance signal. When the waveforms across the change point or waveforms before and after the change point are flat, the edge detection circuit 103 detects a predetermined range of the luminance signal including the change point as edges. Therefore, the edge detection circuit 103 detects, as edges, leading and trailing edges, indicated with M and N, respectively, of the step-like signal waveform as shown in FIG. 11 while not detecting, as edges, other waveform portions such as a completely flat waveform, a waveform varying with a high frequency, for example. When the edge detection circuit 103 has detected edges of the luminance signal, it will output a pulse signal whose level is "H" to the rise detection circuit 104 and waveform balancer 105. It should be noted that an example configuration of the edge detection circuit 103 will be described in detail later.

The rise detection circuit 104 detects whether the supplied luminance signal rises or falls, namely, whether the luminance signal has increased. At this time, the rise detection circuit 104 is adjusted in sensitivity to increase of the luminance signal not to detect any rise of a luminance signal having been increased only slightly and of a luminance signal having a high frequency-caused variation of the rise and fall. The rise detection circuit 104 outputs a rise signal, whose level is high (H) when the luminance signal rises, to the waveform balancer 105. It should be noted that an example configuration of the rise detection circuit 104 will be described in detail later.

The waveform balancer 105 multiplies the horizontal edge component output from the horizontal BPF 51 by a predetermined gain coefficient to shape the waveform. At this time, the magnitude of the gain coefficient by which the horizontal edge components are multiplied is selectively controlled depending upon whether the condition is either of the following ones (1) and (2) as in the first embodiment:

(1) The horizontal component of the luminance signal rises or falls, or it neither rises nor falls.

(2) The signal level of the horizontal edge component is positive (white) or negative (black).

More specifically, the waveform balancer 104 determines the states of the rise signal from the rise detection circuit 52 and edge signal from the edge detection circuit 103 and whether the signal level of the horizontal edge component is positive or negative as above to switch the gain coefficient magnitude from one to another.

The edge component shaped in waveform by the waveform balancer 105 as above is supplied to a gain control circuit 54. It should be noted that an example configuration of the waveform balancer 105 and examples of the gain will be described in detail later.

The gain control circuit 54 multiplies the horizontal edge component by a predetermined gain control coefficient to adjust the extent of the horizontal edge enhancement. The output from the gain control circuit 54 is supplied to the level limiter 55. The level limiter 55 limits the signal level of a part of the edge component from the gain control circuit 54, which exceeds a predetermined signal level, to output a final horizontal edge enhancement signal.

The edge-enhancement signal generated by the image enhancer 101 as above is added to a main video signal. The video signal having such an edge-enhancement signal added thereto becomes an edge-enhanced picture well defining the edge of an object.

(Waveform Balancer)

Next, the waveform balancer 105 will be described in further detail below:

The waveform balancer 105 shapes the waveform of the horizontal edge component output from the horizontal BPF 51 by multiplying it by a predetermined gain coefficient. At this time, the magnitude of the gain coefficient by which the horizontal edge component is multiplied is selectively controlled depending upon whether the condition is either of the above ones (1) and (2) in the first embodiment.

Figure 12:
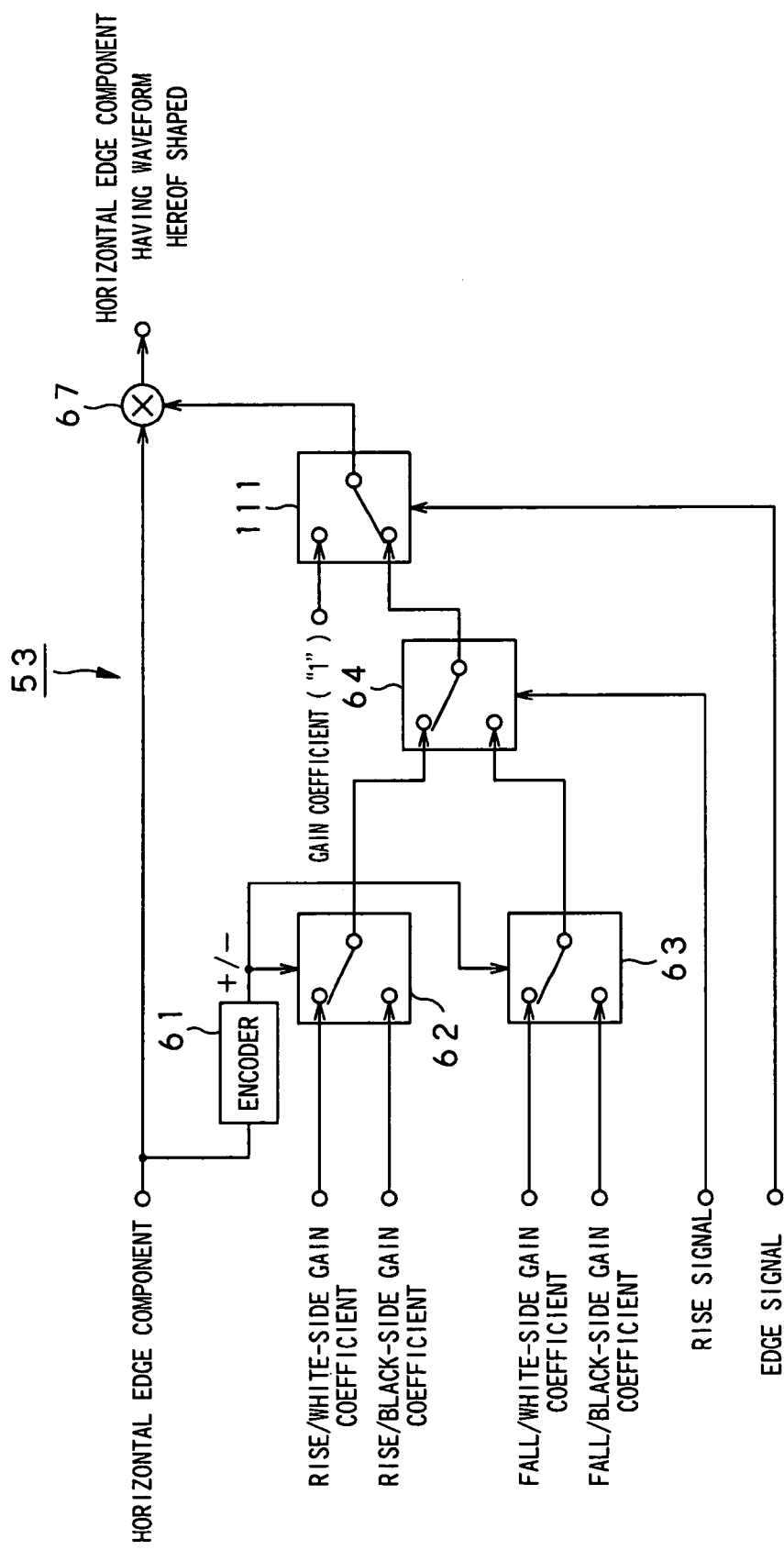
FIG. 12 shows the construction of a waveform balancer used in the image enhancer in FIG. 10.

A concrete circuit configuration of the waveform balancer 105 is shown in FIG. 12.

As shown, the waveform balancer 105 includes an encoder 61, first to fourth selectors 62, 63, 64 and 111 and a multiplier 67.

The encoder 61 discriminates between signs (positive/negative) of the horizontal edge component output from the horizontal BPF 51. When the sign is "plus (positive)", the encoder 61 will provide a "high (H)" output. Alternatively, when the sign is "minus (negative)", the encoder 61 will provide a "low (L)" output.

The first selector 62 selectively outputs a rise/white-side gain or a rise/black-side gain depending upon the output from the encoder 61. When the output from the encoder 61 is "H", the first selector 62 will select and output the rise/white-side gain. When the output from the encoder 61 is "L", the first selector 62 will select and output the rise/black-side gain.

The second selector 63 selectively outputs a fall/white-side gain or a fall/black-side gain depending upon the output from the encoder 61. When the output from the encoder 61 is "H", the second selector 63 will select and output the fall/white-side gain. When the output from the encoder 61 is "L", the second selector 63 will select and output the fall/black-side gain.

The third selector 64 selectively outputs an output from the first selector 62 or an output from the second selector 63 depending upon a rise signal output from the rise detection circuit 104. When the rise signal is "H", namely, when the horizontal component of the luminance signal is rising, the third selector 64 will select and output the output from the first selector 62. When the rise signal is "L", namely, when the horizontal component of the luminance signal is in any other state than the rising, the third selector 64 will select and output the output from the second selector 63.

The fourth selector 111 selectively outputs a gain coefficient as large as the predetermined value or an output from the third selector 64 depending upon an the edge signal from the edge detection circuit 103. When the output from the edge signal is "H", namely, when the video signal having a step-like waveform is rising or falling, the fourth selector 111 will select and output the output from the third selector 64. When the edge signal is "L", the fourth selector 111 will select and output a gain coefficient as large as the predetermined value.

The multiplier 67 multiplies the horizontal edge component output from the horizontal BPF 51 and gain coefficient output from the fourth selector 111 to shape the waveform.

(Edge Detection Circuit)

Next, the edge detection circuit 103 will be described.

Figure 13:
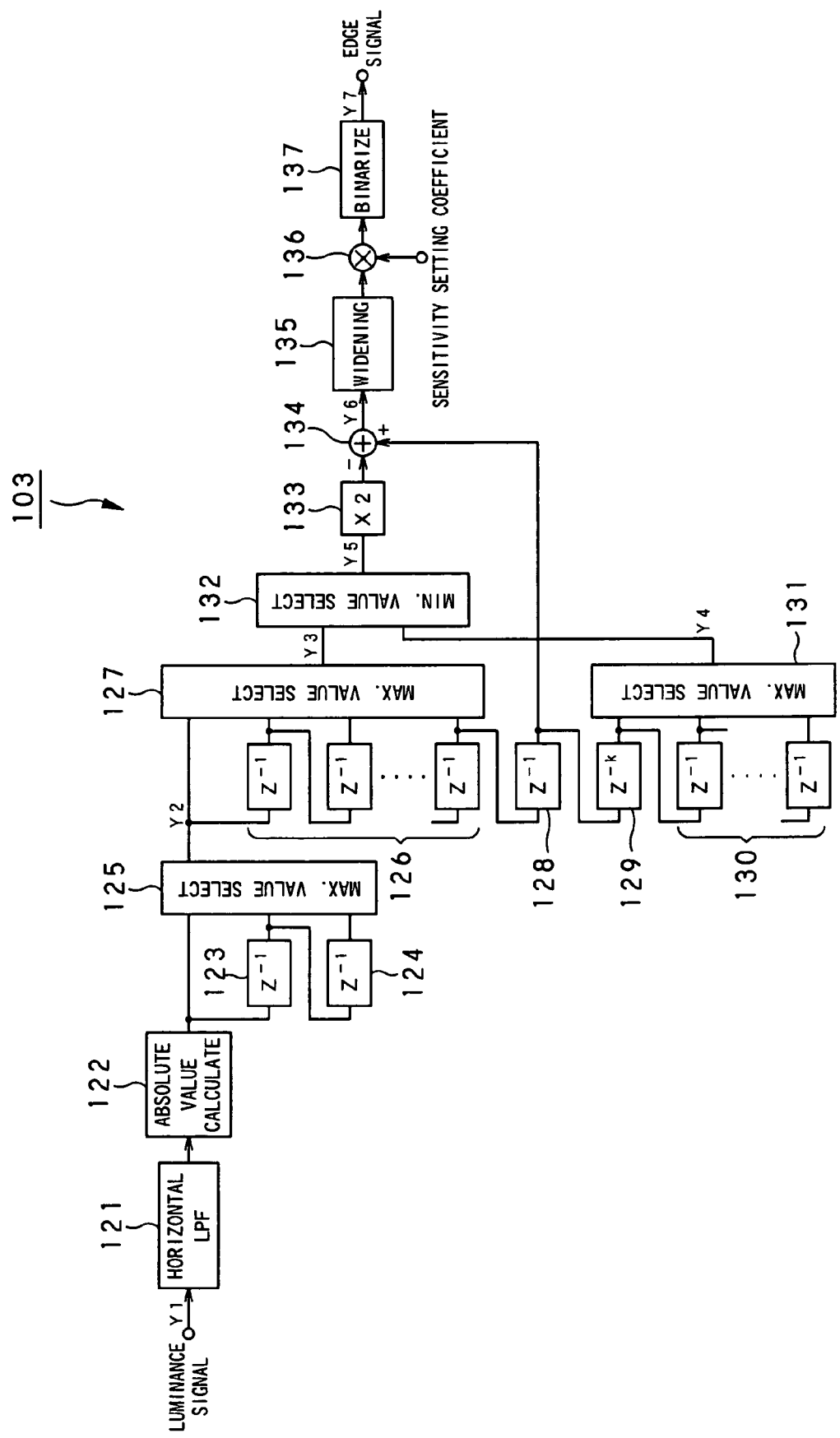
FIG. 13 is a block diagram of an edge detection circuit in the image enhancer in FIG. 10.

FIG. 13 is a block diagram of the edge detection circuit 103.

As shown, the edge detection circuit 103 includes a horizontal bandpass filter (BPF) 121, absolute value calculation circuit 122, first and second delay elements 123 and 124, first maximum value selection circuit 125, first N-step shift register 126, second maximum value selection circuit 127, third and fourth delay elements 128 and 129, second N-step shift register 130, third maximum value selection circuit 131, minimum value selection circuit 132, double amplifier 133, subtraction circuit 134, widening circuit 135, multiplication circuit 136 and a binarization circuit 137.

The horizontal BPF 121 is supplied with a luminance signal output from the horizontal component R/G/B mixing circuit 34, and cuts off a high frequency component (edge component) from the luminance signal. Depending upon the frequency characteristic of the filter, the frequency band of an edge component to be cut off will vary. However, since the influence of the frequency band variation can be adjusted in downstream steps of operation, the filter characteristic may not be strictly precise. The horizontal LPG 121 may include any set of filter coefficients so long as the filter characteristic is such as will provide passband peaks at about ⅙ to ¼ of the sampling frequency. The number of filter coefficients in the set is taken herein as (−1, −2, 1, 4, 1, −2, −1)/8, for example. The edge component output from the horizontal BPF 121 is supplied to the absolute value calculation circuit 122.

The absolute value calculation circuit 122 outputs the absolute value of the supplied edge component. The absolute value of the edge component is supplied to the first delay element 123 and first maximum value selection circuit 125.

The first delay element 123 delays the signal output from the horizontal BPF 121 one unit time. The unit time refers herein to one clock in the digital signal processing. The second delay element 124 delays, a further one unit time, the signal having been delayed by the first delay element 123. The first maximum value selection circuit 125 compares the non-delayed signal from the absolute value calculation circuit 122, the signal supplied from the first delay element 123 and having been delayed one unit time and the signal supplied from the second delay element 124 and having been delayed two unit times to select a maximum value. Noise component is reduced from the signal through this selection of the maximum value. It should be noted the two delay elements are referred to above but any number of delay elements may be used. The output from the first maximum value selection circuit 125 is supplied to the first shift register 126 and second maximum value selection circuit 127.

The first shift register 126 includes a predetermined number of delay elements to make shift registration of a signal supplied from the first maximum value selection circuit 125 in units of a clock. Also, signals stored in the delay elements of the first shift register 126 are supplied to the second maximum value selection circuit 127.

The second maximum value selection circuit 127 compares the non-delayed signal output from the first maximum value selection circuit 125 and delayed signal output from each delay element of the first shift register 126 to select a maximum value from the signals. The selected maximum value is supplied to the minimum value selection circuit 132.

The third dely element 128 delays the signal from the last-stage delay element of the first shift register 126 to delay the signal a number k of clocks. The output from the third delay element 128 is supplied to the fourth delay element 129 and subtraction circuit 134.

The fourth delay element 129 is supplied with the signal delayed the number k of clocks by the third delay element 128 to further delay the signal a number k of clocks. The output from the fourth delay element 129 is supplied to the second shift register 130 and third maximum value selection circuit 131.

The second shift register 130 includes a predetermined number of delay elements to make shift registration of a signal supplied from the fourth delay element 129 in units of a clock. Also, signals stored in the delay elements of the second shift register 130 are supplied to the third maximum value selection circuit 131.

The third maximum value selection circuit 131 compares the non-delayed signal output from the fourth delay element 129 and delayed signal from each delay element of the second shift register 130 to select a maximum value from the signals. The selected maximum value is supplied to the minimum value selection circuit 132.

The minimum value selection circuit 132 selects and outputs the signal output from the second maximum value selection circuit 127 or signal output from the third maximum value selection circuit 131, whichever is smaller in value. The output from the minimum value selection circuit 132 is supplied to the double amplifier 133 which will double the signal output and supply it to the subtraction circuit 134. The subtraction circuit 134 subtracts the signal output from the double amplifier 133 from the signal output from the third delay element 128. A signal resulted from the subtraction by the subtraction circuit 134 is supplied to the widening circuit 135.

The widening circuit 135 widens the positive-side portion of the supplied signal along the time base. Thus, an output signal from the widening circuit 135 is supplied to the multiplication circuit 136. The multiplication circuit 136 multiplies the input signal by a sensitivity setting coefficient and supplies the result of multiplication to the binarization circuit 137 where the input signal will be binarized to output a high/low pulse signal. The "H" portion of the pulse signal indicates an edge of the luminance signal and provided as an edge signal.

Figure 14:
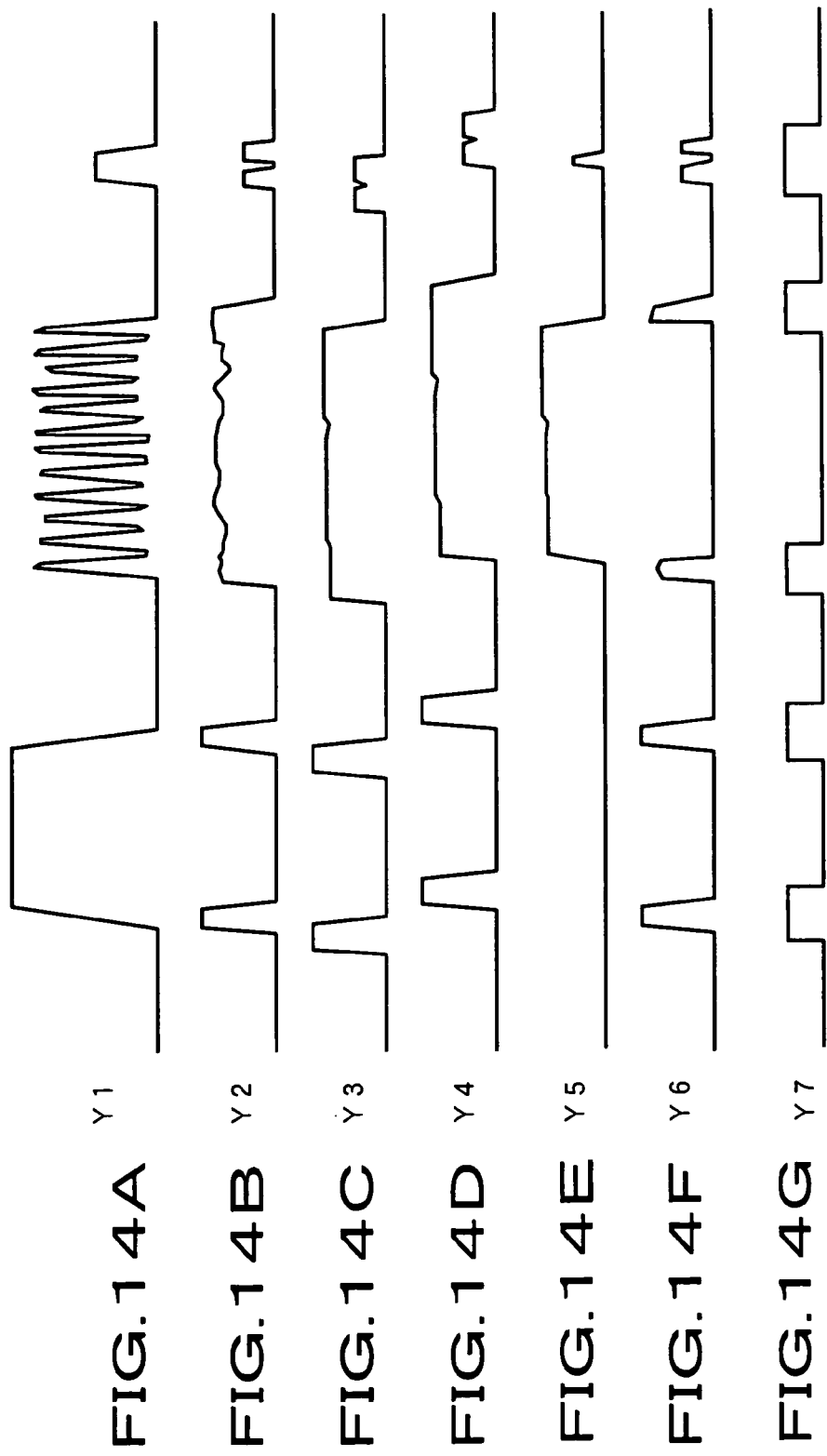
FIGS. 14A to 14G explain the signal processing in the edge detection circuit.

Next, signal processing operations made in the edge detection circuit 103 will be described in detail below with reference to waveform charts shown in FIGS. 14A to 14G. It should be noted that FIGS. 14A to 14G show signal waveforms detected at various points in the edge detection circuit 103 but the same time base is used for the waveforms with the group delay caused in the digital signal processing being considered to include no time. FIG. 14A shows a waveform at a point Y1 in FIG. 13, FIG. 14B shows a waveform at a point Y2 in FIG. 13, FIG. 14C shows a waveform at a point Y3 in FIG. 13, FIG. 14D shows a waveform at a point Y4 in FIG. 13, FIG. 14E shows a waveform at a point Y5 in FIG. 13, FIG. 14F shows a waveform at a point Y6 in FIG. 13, and FIG. 14G shows a waveform at a point Y7 in FIG. 13.

First it is assumed that the edge detection circuit 103 is supplied with a step-like pulse waveform followed by a luminance signal having a pattern of small vertical stripes as shown in FIG. 14A.

The luminance signal is supplied to the horizontal BPF 121 where an edge component is extracted from the luminance signal, and then the absolute value calculation circuit 122 outputs an absolute value of the signal value. The output from the absolute value calculation circuit 122 is supplied to the first maximum value selection circuit 125 which will select a change point and maximum values before and after the change point. The change point and maximum values are shown as waveforms in FIG. 14B.

The output from the first maximum value selection circuit 125 is supplied to the edge detection circuit 103 composed of the first and second shift registers 126 and 130, second and third maximum value selection circuits 127 and 131, third and fourth delay elements 128 and 129, minimum value selection circuit 132, double amplifier 133 and the subtraction circuit 134.

The number of delay elements in each of the first and second shift registers 126 and 130 and delay time of each of the third and fourth delay elements 128 and 129 depend upon the sampling frequency in the digital signal processing (proportional to the number of pixels in the CCD used), frequency characteristic of the horizontal BPF 121 and spatial frequency component of the edge portion of the luminance signal. For example, in case it is intended to drive a CCD having 500,000 pixels (having 960 horizontal effective-picture pixels and 483 vertical effective-picture pixels) with a horizontal frequency of 18 MHz and process signals from the CCD with a frequency doubled by up-conversion (36 MHz) and when the BPF 121 has the above-mentioned characteristic, the number of delay elements in each of the first and second shift registers 126 and 130 are set to nine and the delay time of each of the third and fourth delay elements 128 and 129 is to eight clocks (k=8). Thus, with a frequency of 2 to 3 MHz or more, a stepwise-varying portion of the luminance signal can be detected. However, the above number and delay time may not be set strictly precise but they may be variable within a certain range and may actually be set while checking a picture. In the following description, nine will be set as the number of delay elements in each of the shift registers 126 and 130 and eight clocks will be set as the delay time of each of the third and fourth delay elements 128 and 129 for the convenience of the explanation.

In the edge detection circuit 103, the output from the third delay element 128 is taken as a current change point. Signals ranging from eight clocks to 17 clocks before the change point are supplied from the first shift register 126 to the second maximum value selection circuit 127 where maximum value will be selected from the supplied signals. The signal output from the second maximum value selection circuit 127 has a waveform as shown in FIG. 14C. On the other hand, signals ranging from eight clocks to 17 clocks after the change point are supplied from the second shift register 130 to the third maximum value selection circuit 131 where a maximum value will be selected from the supplied signals. The signal output from the third maximum value selection circuit 131 has a waveform as shown in FIG. 14D.

These maximum value signals are supplied to the minimum value selection circuit 132 where any of the signals which is smaller will be selected to provide a signal having a waveform as shown in FIG. 14E.

The output from the minimum value selection circuit 132 is doubled by the double amplifier 133 and supplied to the subtraction circuit 134. The subtraction circuit 134 subtracts the signal from the double amplifier 133 from the signal of the change point. That is, it subtracts the signal shown in FIG. 14E from the signal of the change point shown in FIG. 14B. Then, the luminance signal will be pulsed only at a stepwise rising portion or stepwise falling portion thereof as shown in FIG. 14F.

The signal output from the subtraction circuit 134 is supplied to the widening circuit 135 where the positive position of the signal will be widened along the time base. The output from the widening circuit 135 is multiplied by a sensitivity adjustment coefficient in the multiplication circuit 136. When the sensitivity adjustment coefficient is larger, the edge detection circuit 103 will detect an edge whose step is smaller and thus a larger sensitivity adjustment coefficient will lead to an increased sensitivity of the edge detection circuit 103. However, if the coefficient is too large, the edge detection circuit 103 will erroneously detect a noise component as an edge. To avoid this, the sensitivity is adjusted according to the S/N ratio of a video signal handled in the system. The signal output from the multiplication circuit 136 is supplied to the binarization circuit 137 where it will be binarized to a signal of H/L (1/0). Then, the binarization circuit 137 provides a final edge signal as shown in FIG. 14G.

As having been described in the foregoing, the edge detection circuit 103 extracts a change point of a luminance signal waveform by means of a bandpass filter, checks portions of the waveform before and after the change point to see whether both the portions are flat or either of them is flat. When both the portions are determined to be flat or either of the them is to be flat, the edge detection circuit 103 will determine a predetermined range of the luminance signal waveform including the change point in consideration to be an edge portion.

(Rise Detection Circuit)

Figure 15:
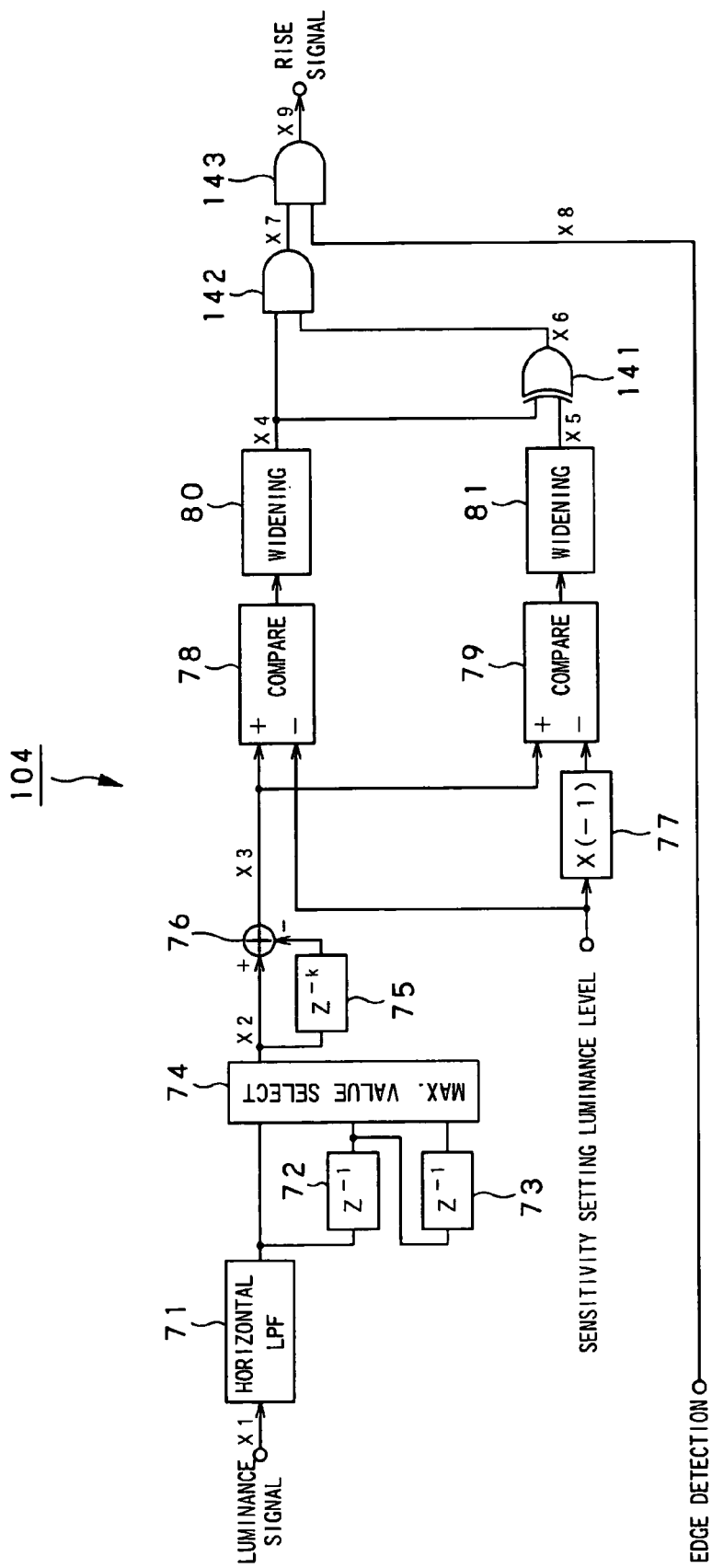
FIG. 15 is a block diagram of a rise/fall detection circuit used in the image enhancer used in the second embodiment of the video camera according to the present invention.

Next, the rise detection circuit 104 will be described with reference to the block diagram thereof shown in FIG. 15.

As shown, the rise detection circuit 104 includes a horizontal lowpass filter (LPF) 71, first and second delay elements 72 and 73, maximum value selection circuit 74, third delay element 75, subtraction circuit 76, inversion circuit 77, first and second comparison circuits 78 and 79, first and second widening circuits 80 and 81, EX-OR circuit 141, and first and second AND circuits 142 and 143.

Since the circuit configuration of the rise detection circuit 104 down to the first and second widening circuits 80 and 81 is the same as the rise/fall detection circuit 52 included in the previously described first embodiment, it will not be described in detail.

A signal output from the first widening circuit 80 is supplied to the first AND circuit 142 and EX-OR circuit 141. A signal output from the second widening circuit 81 is supplied to the EX-OR circuit 141.

The EX-OR circuit 141 provides a pulse signal whose level will become high (H) when the output from the first widening circuit 80 is not found coincident with the output from the second widening circuit 81.

The first AND circuit 142 ANDs the output from the first widening circuit 80 and the output from the EX-OR circuit 141 and provides an output.

The second AND circuit 143 ANDs the output from the first AND circuit 142 and edge signal and provides the result of AND as a rise signal.

Next, signal processing operations made in the rise detection circuit 104 will be described in detail below with reference to waveform charts shown in FIGS. 16A to 16I. It should be noted that FIGS. 16A to 16I show signal waveforms detected at various points in the rise detection circuit 104 but the same time base is used for the waveforms with the group delay caused in the digital signal processing being considered to include no time. FIG. 16A shows a waveform at a point X1 in FIG. 15, FIG. 16B shows a waveform at a point X2 in FIG. 15, FIG. 16C shows a waveform at a point X3 in FIG. 15, FIG. 16D shows a waveform at a point X4 in FIG. 15, FIG. 16E shows a waveform at a point X5 in FIG. 15, FIG. 16F shows a waveform at a point X6 in FIG. 15, FIG. 16G shows a waveform at a point X7 in FIG. 15, FIG. 16H shows a waveform at a point X8 in FIG. 15, and FIG. 16I shows a waveform at a point X9 in FIG. 15.

First it is assumed that the rise detection circuit 104 is supplied with a step-like pulse waveform followed by a luminance signal having a pattern of small vertical stripes as shown in FIG. 16A.

The first comparison circuit 78 compares the output from the addition circuit 76 with a sensitivity setting luminance level and binarizes the result of comparison to provide a pulse signal whose level will become high (H) when the luminance signal rises. The sensitivity setting luminance level should be set to a predetermined signal level at which no erroneous detection will take place due to any noise. The pulse signal output from the first comparison circuit 78 will have the time duration thereof, for which it is kept at "H" level, widened by the first widening circuit 80, and be provided as a rise signal as shown in FIG. 16D.

The second comparison circuit 79 compares the output from the addition circuit 76 with an inverted value of the sensitivity setting luminance level and binarizes the result of comparison to provide a pulse signal whose level will become high (H) when the luminance signal falls. The pulse signal output from the second comparison circuit 79 will have the time duration thereof, for which it is kept at "H" level, widened by the second widening circuit 81, and be provided as a fall signal as shown in FIG. 16E.

The rise and fall pulse signals are supplied to the EX-OR circuit 141 which will provide an output signal having a waveform as shown in FIG. 16F. The output from the EX-OR circuit 141 is supplied to the first AND circuit 142 where it will be ANDed with the rise pulse signal to provide an output signal having a waveform as shown in FIG. 16G. The output from the first AND circuit 142 is ANDed with an edge signal to provide an output signal having a waveform as shown in FIG. 16H.

As above, the rise detection circuit 104 provides a rise signal masked by the edge signal. Thus, the rise signal will be provided as an output which does not include a portion M of the waveform shown in FIG. 16D and a portion N of the waveform shown in FIG. 16E, which will be detected as a rise in the first embodiment, for example, when the signal has a pattern of fine vertical stripes.

As having been described in the foregoing, in the second embodiment of the video camera according to the present invention, when a horizontal high frequency component of a luminance signal is extracted and multiplied by a gain coefficient to generate an edge enhancement signal, the gain coefficient by which the edge enhancement signal is multiplied is changed according to the signal level of the horizontal high frequency component of the video signal and the leading and trailing edges of the video signal.

Thus, in the second embodiment of the video camera, the circuit of a small scale can be used to correct a horizontal waveform distortion of the video signal due to the influence of an analog circuit etc., to thereby enhance the edge of a picture.

Further, in the second embodiment of the video camera, the gain is controlled for only a portion stepwise changing in horizontal signal level to generate an edge enhancement signal. Therefore, in the video camera, waveform distortion can be corrected for only a stepwise changing waveform edge of a video signal whose waveform distortion is likely to be remarkable. This signal processing will not have any influence on a portion of a video signal where a return distortion takes place when a distortion of a vertical stripe-like waveform is corrected, for example.

The invention claimed is:

1. An edge enhancing apparatus comprising:
   a filter for extracting a horizontal high-frequency component from a video signal;
   a signal level detecting means for discriminating between positive and negative of signal levels of the high frequency component detected by the filter;
   a rise and fall detecting means for discriminating between leading and trailing edges of the video signal;
   an enhancement signal generating means for generating an enhancement signal by multiplying the high frequency component extracted by the filter by a gain; and
   an adding means for adding the enhancement signal to the video signal;
   the enhancement signal generating means
   makes the gain larger than a predetermined value when the signal level of the high frequency component at the leading edge of the video signal is positive while making the gain equal to or smaller than the predetermined value when the signal level of the high frequency component at the leading edge of the video signal is negative;
   makes the gain equal to or smaller than the predetermined value when the signal level of the high frequency component at the trailing edge of the video signal is positive while making the gain larger than a predetermined value when the signal level of the high frequency component at the trailing edge of the video signal is negative.

2. The edge enhancing apparatus as set forth in claim 1, wherein the predetermined value is "1".

3. The edge enhancing apparatus as set forth in claim 1, wherein the rise and fall detecting means detects the leading and trailing edges when the horizontal component of the video signal changes stepwise.

4. An edge enhancing apparatus comprising:
   a filter for extracting a horizontal high-frequency component from a video signal;
   a signal level detecting means for discriminating between positive and negative of signal levels of the high frequency component detected by the filter;
   a rise and fall detecting means for discriminating between leading and trailing edges of the video signal;
   an enhancement signal generating means for generating an enhancement signal by multiplying the high frequency component extracted by the filter by a gain; and
   an adding means for adding the enhancement signal to the video signal;
   the enhancement signal generating means
   makes the gain equal to or smaller than a predetermined value when the signal level of the high frequency component at the leading edge of the video signal is positive while making the gain larger than the predetermined value when the signal level of the high frequency component at the leading edge of the video signal is negative; and makes the gain larger than the predetermined value when the signal level of the high frequency component at the trailing edge of the video signal is positive while making the gain equal to or smaller than the predetermined value when the signal level of the high frequency component at the trailing edge of the video signal is negative.

5. The edge enhancing apparatus as set forth in claim 4, wherein the predetermined value is "1".

6. The edge enhancing apparatus as set forth in claim 4, wherein the rise and fall detecting means detects the leading and trailing edges when the horizontal component of the video signal changes stepwise.

7. An edge enhancing method comprising steps of:
extracting a horizontal high-frequency component from a video signal;
generating an enhancement signal by multiplying the horizontal high-frequency component extracted from a video signal by a gain, which is changed according to the result of discrimination between positive and negative of the signal levels of the high frequency component and the result of discrimination between the leading and trailing edges of the video signal; and
enhancing an edge by adding the enhancement signal to the original video signal,
wherein the gain is made larger than a predetermined value when the signal level of the high frequency component at the leading edge of the video signal is positive while the gain is made equal to or smaller than the predetermined value when the signal level of the high frequency component at the leading edge of the video signal is negative; and
the gain is made equal to or smaller than the predetermined value when the signal level of the high frequency component at the trailing edge of the video signal is positive while the gain made larger than the predetermined value when the signal level of the high frequency component at the trailing edge of the video signal is negative.

8. The edge enhancing method as set forth in claim 7, wherein the predetermined value is "1".

9. The edge enhancing method as set forth in claim 7, wherein the leading and trailing edges are leading and trailing edges when the horizontal component of the video signal changes stepwise.

10. An edge enhancing method comprising steps of:
extracting a horizontal high-frequency component from a video signal;
generating an enhancement signal by multiplying the horizontal high-frequency component extracted from a video signal by a gain, a value of which is changed according to the result of discrimination between positive and negative of the signal levels of the high frequency component and the result of discrimination between the leading and trailing edges of the video signal; and
enhancing an edge by adding the enhancement signal to the original video signal,
wherein the gain is made equal to or smaller than a predetermined value when the signal level of the high frequency component at the leading edge of the video signal is positive while the gain is made larger than the predetermined value when the signal level of the high frequency component at the leading edge of the video signal is negative; and
the gain is made larger than the predetermined value when the signal level of the high frequency component at the trailing edge of the video signal is positive while the gain made equal to or smaller than the predetermined value when the signal level of the high frequency component at the trailing edge of the video signal is negative.

11. The edge enhancing method as set forth in claim 10, wherein the predetermined value is "1".

12. The edge enhancing method as set forth in claim 10, wherein leading and trailing edges are leading and trailing edges when the horizontal component of the video signal changes stepwise.

13. A video camera comprising:
an imaging means for imaging an object to generate a video signal;
a filter for extracting a horizontal high-frequency component from the video signal generated by the imaging means;
a signal level detecting means for discriminating between positive and negative of signal levels of the high frequency component detected by the filter;
a rise and fall detecting means for discriminating between leading and trailing edges of the video signal;
an enhancement signal generating means for generating an enhancement signal by multiplying the high frequency component by a gain; and
an adding means for adding the enhancement signal to the video signal;
the enhancement signal generating means
makes the gain larger than a predetermined value when the signal level of the high frequency component at the leading edge of the video signal is positive while making the gain equal to or smaller than the predetermined value when the signal level of the high frequency component at the leading edge of the video signal is negative;
makes the gain equal to or smaller than the predetermined value when the signal level of the high frequency component at the trailing edge of the video signal is positive while making the gain larger than the predetermined value when the signal level of the high frequency component at the trailing edge of the video signal is negative.

14. The video camera as set forth in claim 13, wherein the predetermined value is "1".

15. The video camera as set forth in claim 13, wherein the rise and fall detecting means detects the leading and trailing edges when the horizontal component of the video signal changes stepwise.

16. A video camera comprising:
an imaging means for imaging an object to generate a video signal;
a filter for extracting a horizontal high-frequency component from the video signal generated by the imaging means;
a signal level detecting means for discriminating between positive and negative of signal levels of the high frequency component detected by the filter;
a rise and fall detecting means for discriminating between leading and trailing edges of the video signal;
an enhancement signal generating means for generating an enhancement signal by multiplying the high frequency component by a gain; and an adding means for adding the enhancement signal to the video signal;

the enhancement signal generating means makes the gain equal to or smaller than a predetermined value when the signal level of the high frequency component at the leading edge of the video signal is positive while making the gain larger than the predetermined value when the signal level of the high frequency component at the leading edge of the video signal is negative;

makes the gain larger than the predetermined value when the signal level of the high frequency component at the trailing edge of the video signal is positive while making the gain equal to or smaller than the predetermined value when the signal level of the high frequency component at the trailing edge of the video signal is negative.

17. The video camera as set forth in claim 16, wherein the predetermined value is "1".

18. The video camera as set forth in claim 16, wherein the rise and fall detecting means detects the leading and trailing edges when the horizontal high-frequency component of the video signal changes stepwise.

* * * * *